(12) United States Patent
Booker et al.

(10) Patent No.: US 12,533,001 B2
(45) Date of Patent: Jan. 27, 2026

(54) UNITARY NONWOVEN MATERIAL

(71) Applicant: Glatfelter Corporation, Charlotte, NC (US)

(72) Inventors: Richard Booker, Arlington, TN (US); Thomas J. Cavanaugh, Cordova, TN (US); Jacek K. Dutkiewicz, Cordova, TN (US)

(73) Assignee: Glatfelter Corporation, Charlotte, NC (US)

( * ) Notice: Subject to any disclaimer, the term of this patent is extended or adjusted under 35 U.S.C. 154(b) by 745 days.

(21) Appl. No.: 17/276,323

(22) PCT Filed: Sep. 19, 2019

(86) PCT No.: PCT/US2019/051896
§ 371 (c)(1),
(2) Date: Mar. 15, 2021

(87) PCT Pub. No.: WO2020/061290
PCT Pub. Date: Mar. 26, 2020

(65) Prior Publication Data
US 2022/0053991 A1    Feb. 24, 2022

Related U.S. Application Data

(60) Provisional application No. 62/733,350, filed on Sep. 19, 2018.

(51) Int. Cl.
*A47L 13/17*     (2006.01)
*B32B 5/02*      (2006.01)
(Continued)

(52) U.S. Cl.
CPC .............. *A47L 13/17* (2013.01); *B32B 5/022* (2013.01); *B32B 5/08* (2013.01); *B32B 5/266* (2021.05);
(Continued)

(58) Field of Classification Search
CPC ............ B32B 2255/02; B32B 2255/06; B32B 2263/02; B32B 2263/0253;
(Continued)

(56) References Cited

U.S. PATENT DOCUMENTS

| | | |
|---|---|---|
| 2,345,543 A | 3/1944 | Wohnsiedler et al. |
| 2,861,319 A | 11/1958 | Breen |

(Continued)

FOREIGN PATENT DOCUMENTS

| | | |
|---|---|---|
| CN | 1434693 A | 8/2003 |
| CN | 101404969 A | 4/2009 |

(Continued)

OTHER PUBLICATIONS

Fiber Innovation Technology, accessed online Oct. 23, 2023.*
(Continued)

*Primary Examiner* — Camie S Thompson
(74) *Attorney, Agent, or Firm* — Blank Rome LLP

(57) ABSTRACT

Nonwoven materials having at least one layer comprising cellulose fibers are provided. The nonwoven materials comprise bonded natural cellulosic fibers having high capillary action. The nonwoven materials are suitable for use in a variety of applications, including absorbent products and pre-moistened cleaning materials with metered release of liquid.

19 Claims, 3 Drawing Sheets

Figure 1:
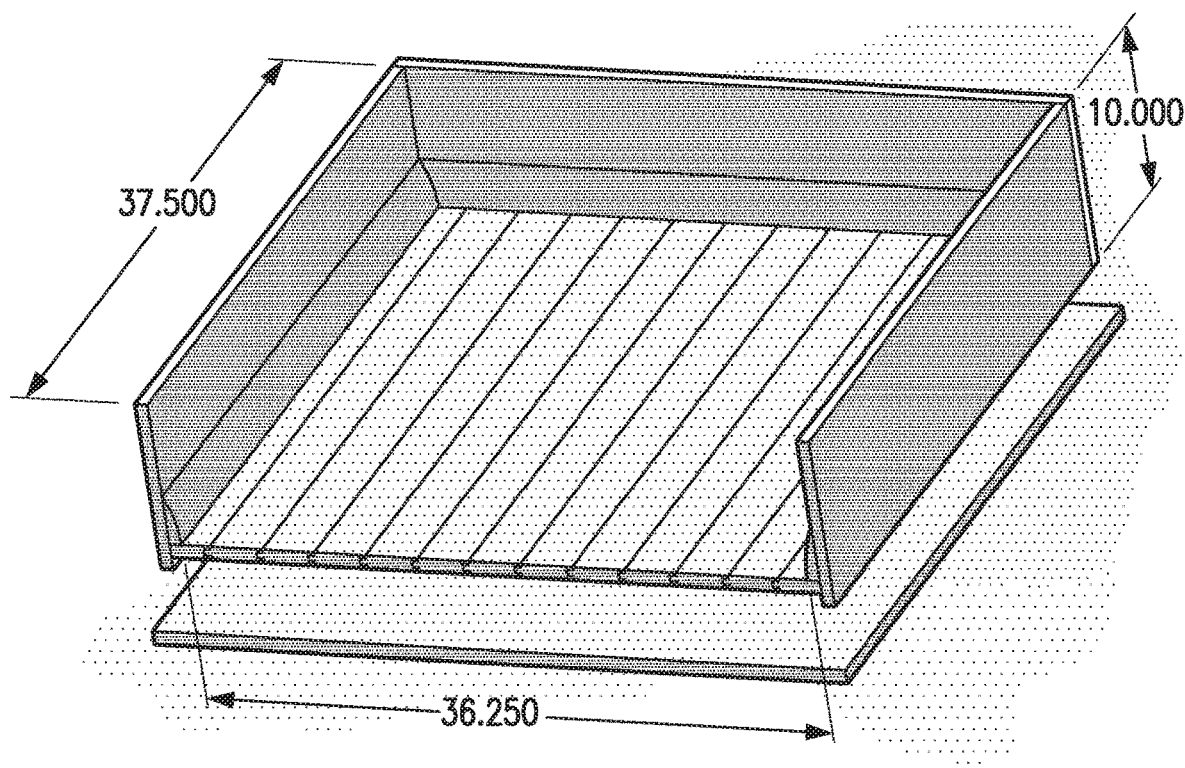

(51) Int. Cl.
| | |
|---|---|
| *B32B 5/08* | (2006.01) |
| *B32B 5/26* | (2006.01) |
| *B32B 7/12* | (2006.01) |
| *C11D 17/04* | (2006.01) |
| *D04H 1/425* | (2012.01) |
| *D04H 1/4291* | (2012.01) |
| *D04H 1/4374* | (2012.01) |
| *D04H 1/541* | (2012.01) |
| *D04H 1/559* | (2012.01) |
| *D04H 1/593* | (2012.01) |
| *D04H 1/732* | (2012.01) |

(52) U.S. Cl.
CPC ............. *B32B 7/12* (2013.01); *C11D 17/049* (2013.01); *D04H 1/425* (2013.01); *D04H 1/4291* (2013.01); *D04H 1/4374* (2013.01); *D04H 1/5412* (2020.05); *D04H 1/5418* (2020.05); *D04H 1/559* (2013.01); *D04H 1/593* (2013.01); *D04H 1/732* (2013.01); *B32B 2255/02* (2013.01); *B32B 2255/26* (2013.01); *B32B 2262/0253* (2013.01); *B32B 2262/067* (2013.01); *B32B 2262/124* (2021.05); *B32B 2262/144* (2021.05); *B32B 2432/00* (2013.01); *D04H 1/5414* (2020.05); *D04H 1/5416* (2020.05)

(58) Field of Classification Search
CPC .......... B32B 2263/04; B32B 2263/062; B32B 2263/067; B32B 2263/12; B32B 2263/14; B32B 2432/00; B32B 2555/00; B32B 2555/02; B32B 5/266; B32B 5/022; B32B 5/08; B32B 5/26; B32B 2262/124; B32B 2262/144; B32B 7/12; B32B 2250/02; B32B 2250/03; C11D 17/049; A47L 13/17; D04H 1/732; D04H 1/5416; D04H 1/5414; D04H 1/5412; D04H 1/425; D04H 1/4291; D04H 1/4374; D04H 1/558; D04H 1/559; D04H 1/593; D04H 1/42; A61F 2013/530386; A61F 2013/530408; A61F 2013/51023; A61F 13/15; A61F 13/511; A61F 13/537; Y10T 442/699; Y10T 442/696; D21H 13/24; D21H 27/007
USPC ................. 442/414, 417; 604/367, 372, 327
See application file for complete search history.

(56) References Cited

U.S. PATENT DOCUMENTS

| | | |
|---|---|---|
| 2,926,116 A | 2/1960 | Keim |
| 2,926,154 A | 2/1960 | Keim |
| 2,929,154 A | 3/1960 | Finnegan |
| 2,931,091 A | 4/1960 | Breen |
| 2,989,798 A | 6/1961 | Bannerman |
| 3,038,235 A | 6/1962 | Zimmerman |
| 3,081,490 A | 3/1963 | Wilhelm |
| 3,117,362 A | 1/1964 | Leonard |
| 3,121,254 A | 2/1964 | Wilhelm |
| 3,163,170 A | 12/1964 | Gates |
| 3,188,689 A | 6/1965 | Leonard |
| 3,224,986 A | 12/1965 | Butler |
| 3,237,245 A | 3/1966 | Kunijiro |
| 3,249,669 A | 5/1966 | Jamieson |
| 3,332,909 A | 7/1967 | Farnham |
| 3,457,342 A | 7/1969 | Parr |
| 3,466,703 A | 9/1969 | Heckrotte |
| 3,469,279 A | 9/1969 | Hudgell |
| 3,500,498 A | 3/1970 | Fukuma et al. |
| 3,556,932 A | 1/1971 | Coscia et al. |
| 3,556,933 A | 1/1971 | Williams et al. |
| 3,585,685 A | 6/1971 | Mcdermott |
| 3,692,423 A | 9/1972 | Okamoto et al. |
| 3,700,623 A | 10/1972 | Keim |
| 3,716,317 A | 2/1973 | Williams et al. |
| 3,772,076 A | 11/1973 | Keim |
| 3,778,208 A | 12/1973 | Bisset et al. |
| 3,787,162 A | 1/1974 | Cheetham |
| 3,814,561 A | 6/1974 | Matsui |
| 3,963,406 A | 6/1976 | Reker |
| 3,972,092 A | 8/1976 | Wood |
| 3,992,499 A | 11/1976 | Lee |
| 4,052,146 A | 10/1977 | Sternberg |
| 4,076,673 A | 2/1978 | Burkholder, Jr. |
| 4,251,200 A | 2/1981 | Parkin |
| 4,350,006 A | 9/1982 | Okamoto |
| 4,370,114 A | 1/1983 | Okamoto |
| 4,406,850 A | 9/1983 | Hills |
| 4,445,833 A | 5/1984 | Moriki |
| 4,600,462 A | 7/1986 | Watt |
| 4,603,176 A | 7/1986 | Bjorkquist |
| 4,605,702 A | 8/1986 | Guerro |
| 4,717,325 A | 1/1988 | Fujimura et al. |
| 4,743,189 A | 5/1988 | Samuelson |
| 4,950,541 A | 8/1990 | Tabor et al. |
| 5,082,899 A | 1/1992 | Sawyer et al. |
| 5,126,199 A | 6/1992 | Sawyer et al. |
| 5,147,343 A | 9/1992 | Kellenberger |
| 5,162,074 A | 11/1992 | Hills |
| 5,256,050 A | 10/1993 | Davies |
| 5,372,885 A | 12/1994 | Tabor et al. |
| 5,378,528 A | 1/1995 | Makoui |
| 5,456,982 A | 10/1995 | Hansen et al. |
| 5,466,337 A | 11/1995 | Darlington et al. |
| 5,505,889 A | 4/1996 | Davies |
| 5,582,913 A | 12/1996 | Simons |
| 5,705,565 A | 1/1998 | Hughes et al. |
| 5,795,439 A | 8/1998 | Euripides et al. |
| 5,807,916 A | 9/1998 | Collette et al. |
| 5,849,211 A | 12/1998 | Hase et al. |
| 5,935,383 A | 8/1999 | Sun et al. |
| 6,017,417 A | 1/2000 | Wendt |
| 6,403,857 B1 | 6/2002 | Gross et al. |
| 6,670,035 B2 | 12/2003 | Pittman et al. |
| 6,958,103 B2 | 10/2005 | Anderson et al. |
| 7,381,297 B2 | 6/2008 | Hernandez-Munoa et al. |
| 7,687,680 B2 | 3/2010 | Clark |
| 2002/0013560 A1 | 1/2002 | Erspanner et al. |
| 2004/0157524 A1 | 8/2004 | Polat |
| 2007/0232180 A1* | 10/2007 | Polat .............. D21H 13/24 604/372 |
| 2009/0236033 A1 | 9/2009 | Zillig et al. |
| 2013/0186580 A1 | 7/2013 | Kavalew et al. |
| 2020/0255992 A1* | 8/2020 | Parsons ............... D04H 1/5418 |

FOREIGN PATENT DOCUMENTS

| | | |
|---|---|---|
| CN | 101668887 A | 3/2010 |
| JP | H03193958 A | 8/1991 |
| JP | H09276193 A | 10/1997 |
| JP | 2004538024 A | 12/2004 |
| JP | 2005505346 A | 2/2005 |
| JP | 2005185429 A | 7/2005 |
| JP | 2006241654 A | 9/2006 |
| JP | 2006265742 A | 10/2006 |
| JP | 2007031856 A | 2/2007 |
| JP | 2015510553 A | 4/2015 |
| JP | 2016516914 A | 6/2016 |
| JP | 2018102406 A | 7/2018 |
| WO | 0059439 A1 | 10/2000 |
| WO | 0166345 A1 | 9/2001 |
| WO | 0187215 A1 | 11/2001 |
| WO | 200187215 A1 | 11/2001 |
| WO | 2004072372 A1 | 8/2004 |
| WO | 2007123702 A2 | 11/2007 |
| WO | 2008132614 A1 | 11/2008 |

(56) References Cited

FOREIGN PATENT DOCUMENTS

WO      2014145804 A1    9/2014
WO      2019067432 A1    4/2019

OTHER PUBLICATIONS

Wikipedia, Polyethylene Terephthalate, accessed online Oct. 23, 2023.*
English translation; Second Chinese Office Action; Chinese Application No. 201980060967.X; 8 pages.
International Preliminary Report on Patentability for International Application No. PCT/US2019/051896 mailed on Mar. 23, 2021, 12 Pages.
International Search Report and Written Opinion for International Application No. PCT/US2019/051896 mailed on Feb. 4, 2020, 17 Pages.
Watson, P., et al., "Canadian pulp fibre morphology: Superiority and considerations for end use potential", The Forestry Chronicle, vol. 85 No. 3, May/Jun. 2009, pp. 401-408.

* cited by examiner

UNITARY NONWOVEN MATERIAL

CROSS REFERENCE TO RELATED APPLICATIONS

This application is a national phase entry of International Application No. PCT/US2019/051896, filed on Sep. 19, 2019, which claims the benefit of priority to U.S. Provisional Application No. 62/733,350 filed on Sep. 19, 2018, the contents of which are hereby incorporated by reference in their entirety.

1. FIELD OF THE INVENTION

The presently disclosed subject matter relates to nonwoven materials that can retain relatively high amounts of liquid in wetted conditions. More particularly, the presently disclosed subject matter relates to nonwoven materials that in dry state retain a liquid after absorption, and in wet state provide a metered release of the liquid.

2. BACKGROUND OF THE INVENTION

Nonwoven structures are important in a wide range of consumer products, such as absorbent articles including baby diapers, adult incontinence products, sanitary napkins, wipes, and the like. Such nonwoven structures can include various layers and/or components, configured to direct and control the acquisition and retention of liquids. Each of these layers and/or components can include a specific fibrous network that provides the desired functionality.

Pre-moistened mopping cloths and wipes are known in the art, however, their material compositions can run out of stored liquid relatively quickly and therefore become unusable in an unacceptably short period of time and/or after cleaning a relatively small area. This causes the consumer to buy and use more pre-moistened cleaning products. Additionally, single use pre-moistened cleaning materials are inefficient when scrubbing action is required which makes consumers rely on other or additional products.

Thus, there remains a need in the art for nonwoven materials that can absorb and gradually release liquid in order to enable a larger surface area to be cleaned. In addition, there remains a need for pre-moistened cleaning materials having improved scrubbing and scouring properties. The disclosed subject matter addresses these and other needs.

The presently disclosed subject matter provides for nonwoven materials comprising bonded natural cellulosic fibers characterized by high capillary action and bonded synthetic fibers. The bonded natural cellulosic fibers can include, for example, mono-component polyester fibers or bicomponent binder fibers. The nonwoven materials of the presently disclosed subject matter provide relatively high liquid retention and a metered release of liquid.

In certain non-limiting embodiments, a unitary airlaid nonwoven material is provided. The nonwoven material can include at least one layer of fibers. The at least one layer of fibers can include cellulose fibers and synthetic fibers. The cellulose fibers can include bonded natural cellulosic fibers having a coarseness less than about 15 mg/100 m.

In certain non-limiting embodiments, the bonded natural cellulosic fibers can have a coarseness in a range of from about 4.2 mg/100 m to about 8.8 mg/100 m.

In certain non-limiting embodiments, the bonded natural cellulosic fibers can have a coarseness of about 6.5 mg/100 m.

In certain non-limiting embodiments, the bonded natural cellulosic fibers can have a Kajaani weighted average length of about 1.5 mm or less.

In certain non-limiting embodiments, the bonded natural cellulosic fibers can include hardwood fibers.

In certain non-limiting embodiments, the bonded natural cellulosic fibers can include eucalyptus pulp.

In certain non-limiting embodiments, the synthetic fibers can include bicomponent binder fibers.

In certain non-limiting embodiments, the bicomponent binder fibers can include eccentric bicomponent fibers. The bicomponent binder fibers can include a polyethylene-based sheath and a core including a polymer having a melting point above about 200° C.

In certain non-limiting embodiments, the unitary airlaid nonwoven material can include at least two layers or fibers.

In certain non-limiting embodiments, the unitary airlaid nonwoven material can further include a layer of cellulose fibers.

In certain non-limiting embodiments, at least one layer of fibers can be coated on at least a portion of its surface with a binder.

In certain non-limiting embodiments, at least one layer of fibers can be coated on at least a portion of its surface with an adhesive.

In certain non-limiting embodiments, the nonwoven material can further include one layer including synthetic fibers.

In certain non-limiting embodiments, the nonwoven material can further include a cleaning formulation.

In certain non-limiting embodiments, the cleaning formulation can be aqueous based.

In certain non-limiting embodiments, a unitary airlaid nonwoven material including two layers of fibers is provided. The first layer can include cellulose fibers and synthetic fibers. The second layer can include cellulose fibers and synthetic fibers.

In certain non-limiting embodiments, the second layer can be coated on at least a portion of its surface with a binder.

In certain non-limiting embodiments, a unitary airlaid nonwoven material is provided. The first layer can include synthetic fibers. The second layer can include cellulose fibers and synthetic fibers. The second layer can be coated on at least a portion of its surface with a binder.

In certain non-limiting embodiments, a unitary airlaid nonwoven material including three layers of fibers is provided. The first layer can include synthetic fibers. The second layer can include cellulose fibers and synthetic fibers. The third layer can include cellulose fibers and synthetic fibers. The second layer can be coated on at least a portion of its surface with a binder. The first layer can be coated on at least a portion of its surface with an adhesive.

The foregoing has outlined broadly the features and technical advantages of the present application in order that the detailed description that follows may be better understood.

Additional features and advantages of the application will be described hereinafter which form the subject of the claims of the application. It should be appreciated by those skilled in the art that the conception and specific embodiment disclosed may be readily utilized as a basis for modifying or designing other structures for carrying out the same purpose of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

4. BRIEF DESCRIPTION OF THE DRAWINGS

Figure 2:
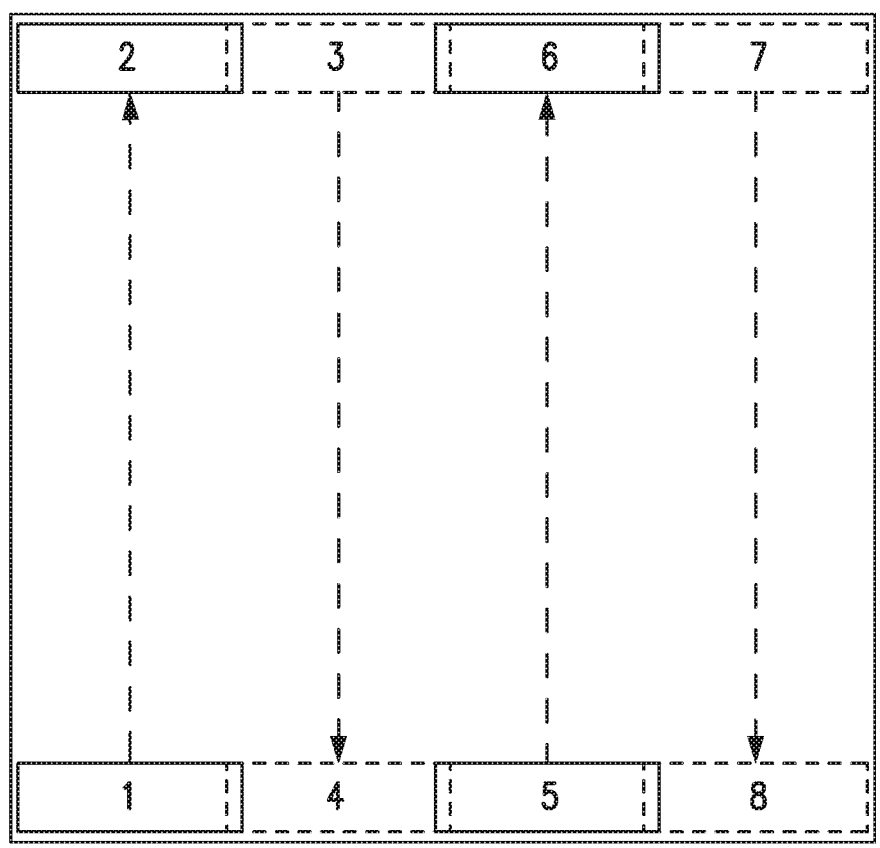
Figure 3:
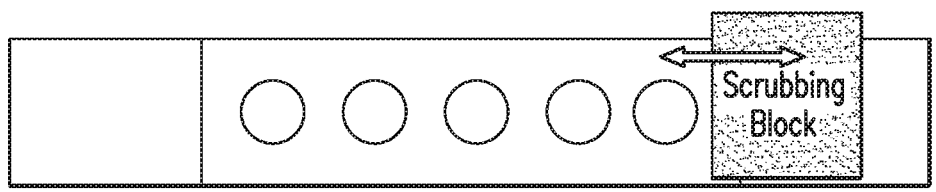

FIG. 1 provides an apparatus for quantitatively measuring liquid release from pre-moistened nonwoven materials, in accordance with Example 3;

FIG. 2 provides a cleaning pattern in which a sweeping tool was moved on the flooring substrate fixture of the apparatus of FIG. 1 during testing of pre-moistened nonwoven materials, in accordance with Example 3; and FIG. 3 provides an apparatus used during stain removal testing of pre-moistened and dry nonwoven materials, in accordance with Examples 4 and 12, respectively.

5. DETAILED DESCRIPTION

The presently disclosed subject matter provides for multilayer unitary absorbent nonwoven materials, which can be used for variety of applications. In particular, the nonwoven materials described herein absorb and store liquids and can be used as absorbent materials for cleaning liquids from hard surfaces. Alternatively, the nonwoven materials can be used in pre-moistened cleaning materials such as pre-moistened wipes and mopping cloths since the nonwoven materials can absorb relatively high amounts of liquid and further provide a metered release of the liquid. The presently disclosed subject matter also provides methods for making such nonwoven materials. These and other aspects of the disclosed subject matter are discussed more in the detailed description and examples.

Definitions

The terms used in this specification generally have their ordinary meanings in the art, within the context of this subject matter and in the specific context where each term is used. Certain terms are defined below to provide additional guidance in describing the compositions and methods of the disclosed subject matter and how to make and use them.

As used in the specification and the appended claims, the singular forms "a," "an" and "the" include plural referents unless the context clearly dictates otherwise. Thus, for example, reference to "a compound" includes mixtures of compounds.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to systems or processes, the term can mean within an order of magnitude, preferably within 5-fold, and more preferably within 2-fold, of a value.

As used herein, the term "weight percent" is meant to refer to either (i) the quantity by weight of a constituent/component in the material as a percentage of the weight of a layer of the material; or (ii) to the quantity by weight of a constituent/component in the material as a percentage of the weight of the final nonwoven material or product.

The term "basis weight" as used herein refers to the quantity by weight of a compound over a given area. Examples of the units of measure include grams per square meter as identified by the acronym "gsm".

As used herein, a "nonwoven" refers to a class of material, including but not limited to textiles or plastics. Nonwovens are sheet or web structures made of fiber, filaments, molten plastic, or plastic films bonded together mechanically, thermally, or chemically. A nonwoven is a fabric made directly from a web of fiber, without the yarn preparation necessary for weaving or knitting. In a nonwoven, the assembly of fibers is held together by one or more of the following: (1) by mechanical interlocking in a random web or mat; (2) by fusing of the fibers, as in the case of thermoplastic fibers; or (3) by bonding with a cementing medium such as a natural or synthetic resin or binder.

As used herein, the term "cellulose" or "cellulosic" includes any material having cellulose as a major constituent, and specifically, comprising at least 50 percent by weight cellulose or a cellulose derivative. Thus, the term includes cotton, typical wood pulps, cellulose acetate, rayon, thermochemical wood pulp, chemical wood pulp, debonded chemical wood pulp, milkweed floss, microcrystalline cellulose, microfibrillated cellulose, and the like.

As used herein, the term "fiber" or "fibrous" refers to a particulate material wherein the length to diameter ratio of such particulate material is greater than about 10. Conversely, a "nonfiber" or "nonfibrous" material is meant to refer to a particulate material wherein the length to diameter ratio of such particulate matter is about 10 or less.

As used herein, the phrase "high core bicomponent fibers" refers to bicomponent fibers having a core-sheath configuration, wherein the core comprises more than 50% of the fiber, by weight. Equivalently states, it can be said that the high core bicomponent fibers have a core to sheath ratio of greater than 1:1.

As used herein, the term "metered release" refers to slowed migration of a liquid in a pre-moistened wipe, resulting in gradual release of liquids from multi-layer nonwoven structures.

As used herein, the term "Kajaani weighted average length" refers to fiber length determined by Kajaani fiber length apparatus.

As used herein, the term "capillary action" refers to the ability of a liquid to flow in narrow spaces without the assistance of, or even in opposition to, external forces such as gravity. Section 2.1.3 "Surface Properties and Capillary Tension" of the Dutkiewicz, J., Nonwoven Structures for Absorption of Body Fluids, (2003) ISBN 2-930159-46-4 (published by Edana-Brussels, Belgium) publication provides additional disclosure with reference to capillary action.

As used herein the terms "coarseness" or "fiber coarseness" refer to weight per fiber length and can be expressed in units of mg/100 m. Coarseness depends on fiber diameter, cell wall thickness, cell wall density and fiber cross section. In general, thinner wood fibers such as hardwood fibers are characterized by lower coarseness whereas thicker wood fibers such as softwood fibers are characterized by higher coarseness.

Fibers

The nonwoven materials of the presently disclosed subject matter comprise synthetic fibers and cellulose fibers.

Synthetic Fibers

The presently disclosed subject matter contemplates the use of synthetic fibers. Non-limiting examples of synthetic fibers suitable for use in the present disclosure include fibers made from various polymers including, by way of example and not by limitation, acrylic polymers, polyamides (including, but not limited to, Nylon 6, Nylon 6/6, Nylon 12, polyaspartic acid, polyglutamic acid), polyamines, polyimides, polyacrylics (including, but not limited to, polyacrylamide, polyacrylonitrile, esters of methacrylic acid and acrylic acid), polycarbonates (including, but not limited to, polybisphenol A carbonate, polypropylene carbonate), polydienes (including, but not limited to, polybutadiene, polyisoprene, polynorbomene), polyepoxides, polyesters (including, but not limited to, polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate), polyethers (including, but not limited to, polyethylene glycol (polyethylene oxide), polybutylene glycol, polypropylene oxide, polyoxymethylene (paraformaldehyde), polytetramethylene ether (polytetrahydrofuran), polyepichlorohydrin), polyfluorocarbons, formaldehyde polymers (including, but not limited to, urea-formaldehyde, melamine-formaldehyde, phenol formaldehyde), natural polymers (including, but not limited to, cellulosics, chitosans, lignins, waxes), polyolefins (including, but not limited to, polyethylene, polypropylene, polybutylene, polybutene, polyoctene), polyphenylenes (including, but not limited to, polyphenylene oxide, polyphenylene sulfide, polyphenylene ether sulfone), silicon containing polymers (including, but not limited to, polydimethyl siloxane, polycarbomethyl silane), polyurethanes, polyvinyls (including, but not limited to, polyvinyl butyral, polyvinyl alcohol, esters and ethers of polyvinyl alcohol, polyvinyl acetate, polystyrene, polymethylstyrene, polyvinyl chloride, polyvinyl pryrrolidone, polymethyl vinyl ether, polyethyl vinyl ether, polyvinyl methyl ketone), polyacetals, polyarylates, and copolymers (including, but not limited to, polyethylene-co-vinyl acetate, polyethylene-co-acrylic acid, polybutylene terephthalate-co-polyethylene terephthalate, polylauryllactam-block-polytetrahydrofuran), polybutylene succinate and polylactic acid based polymers, derivatives thereof, copolymers thereof, and the like, or combinations thereof. In certain embodiments, these polymer materials can be used in a monocomponent fiber. Alternatively, two or more polymer materials can be used together in a bicomponent fiber, e.g., a high core bicomponent fiber or a low core bicomponent fiber.

In certain non-limiting embodiments, the synthetic fibers can comprise monocomponent fibers (i.e., single synthetic polymer or copolymer component in the fibers), bicomponent fibers (i.e., two synthetic polymer or copolymer components in the fibers), multicomponent fibers (i.e., more than two synthetic polymer or copolymer components in the fibers), or combinations thereof.

In certain non-limiting embodiments, the synthetic fibers can comprise monocomponent fibers, in which the monocomponent fibers can comprise polyethylene, polypropylene, polyester, polylactic acid (PLA), and the like, or combinations thereof.

In certain-nonlimiting embodiments, the synthetic fibers can comprise bicomponent fibers. Generally, bicomponent fibers can have a core and a sheath surrounding the core, wherein the core and the sheath comprises different polymers. For example, the core comprises a first polymer, and the sheath comprises a second polymer, wherein the first polymer and the second polymer are different (e.g., the first polymer and the second polymer have different melting temperature). Bicomponent fibers are typically used for producing nonwoven materials by air-laid techniques.

The presently disclosed subject matter contemplates the use of synthetic fibers, such as high core bicomponent fibers. Bicomponent fibers having a core and sheath are known in the art, but the present disclosure can utilize bicomponent fibers having a high core to sheath ratio that exceeds 1:1, i.e., the high core bicomponent fibers comprise more than 50% core by weight. Without being bound to a particular theory, it is believed that the high core bicomponent fibers can impart improved physical integrity, resiliency, and resistance to mechanical compression and/or tension to a nonwoven material. For example, the high core bicomponent fibers can impart these improved properties due to the increased volume of the core relative to the sheath.

As embodied herein, the high core bicomponent fibers can have a polyethylene sheath. The core of the high core bicomponent fibers can be made from a polymer with a melting point greater than about 200° C. and higher density than the polyethylene sheath. For example and not limitation, suitable core polymers include high melt point polyesters, such as poly(ethylene terephthalate) (PET), and polypropylene (PP). The core to sheath ratio of the high core bicomponent fibers can range from about 1:1 to about 2.5:1, or from about 1:1 to about 7:3, or from about 1.5:1 to about 7:3.

In certain embodiments, a high core bicomponent fiber can have a PET core and a polyethylene sheath in an eccentric configuration, wherein the PET core forms more than about 50% and no more than about 70% by weight of the fiber. For example, and not limitation, the PET core can form from about 60% to about 70% by weight of the fiber, and preferably, about 70% by weight of the fiber. In alternative embodiments, the high core bicomponent fibers can comprise a polypropylene core and a polyethylene sheath. In particular embodiments, such a high core bicomponent fiber can have a dtex of from about 1.7 dtex and a cut length of about 6 mm, although a person of skill in the art will appreciate that the bicomponent fiber can be formed with other thicknesses and cut lengths. For example and not limitation, the high core bicomponent fiber can have a dtex of from about 1.3 dtex to about 6.7 dtex, or from about 1.7 dtex to about 3.3 dtex. Additionally or alternatively, the high core bicomponent fiber can have a cut length of from about 4 mm to about 8 mm.

In addition to high core bicomponent fibers, the nonwoven material can further include any suitable additional bicomponent fibers, as known in the art. The additional bicomponent fibers can be conventional, commercially available fibers or can be low core bicomponent fibers, having a core to sheath ratio of less than 1:1, i.e., the low core bicomponent fibers comprise less than 50% core by weight. For example, suitable low core bicomponent fibers can comprise a PET core and a polyethylene sheath in an eccentric configuration and the PET core can form at least about 30% and less than about 50% by weight of the fiber, preferable from about 30% to about 40% by weight of the fiber, and more preferably about 30% by weight the fiber. In certain embodiments, a low core bicomponent fiber can impart improved strength to a nonwoven material, e.g., due to increased inter-fiber bonding due to the high volume of the sheath relative to the core. Low core bicomponent fibers can have a core to sheath ratio of 1:1, i.e., the low core bicomponent fibers comprise 50% core by weight.

However, many other varieties of bicomponent fibers are used in the manufacture of nonwoven materials, particularly those produced for use in airlaid techniques, and are suitable for use in the presently disclosed nonwoven materials. Various bicomponent fibers suitable for use in the presently disclosed subject matter are disclosed in U.S. Pat. Nos. 5,372,885 and 5,456,982, both of which are hereby incorporated by reference in their entireties. Examples of bicomponent fiber manufacturers include, but are not limited to, Trevira (Bobingen, Germany), Fiber Innovation Technologies (Johnson City, TN) and ES Fiber Visions (Athens, GA).

The additional bicomponent fibers can also incorporate a variety of polymers as their core and sheath components. Bicomponent fibers that have a PE (polyethylene) or modified PE sheath typically have a PET (polyethylene terephthalate) or PP (polypropylene) core. In one embodiment, the bicomponent fibers have a core made of polypropylene and a sheath made of polyethylene. Alternatively, or additionally, the bicomponent fibers can have a core made of polyester (e.g., PET) and a sheath made of polyethylene.

As embodied herein, the bicomponent fiber can be low staple fibers having a dtex from about 1.0 dtex to about 15.0 dtex, or from about 1.0 dtex to about 10.0 dtex, and more preferably no more than about 5.7 dtex. For example, the dtex of the bicomponent fiber can be about 1.7 dtex, about 2.0 dtex, about 2.2 dtex, about 3.0 dtex, about 3.3 dtex, about 5.0 dtex, or about 5.7 dtex. The length of the bicomponent fiber can be from about 2 mm to about 36 mm, preferably from about 3 mm to about 12 mm, more preferably from about 3 mm to about 10, even more preferably from about 4 mm to about 8 mm. In particular embodiments, the length of the bicomponent fiber is from about 4 mm to about 6 mm, or about 4 mm, or about 6 mm.

Bicomponent fibers are typically fabricated commercially by melt spinning. In this procedure, each molten polymer is extruded through a die, for example, a spinneret, with subsequent pulling of the molten polymer to move it away from the face of the spinneret. This is followed by solidification of the polymer by heat transfer to a surrounding fluid medium, for example chilled air, and taking up of the now solid filament. Non-limiting examples of additional steps after melt spinning can also include hot or cold drawing, heat treating, crimping and cutting. This overall manufacturing process is generally carried out as a discontinuous two-step process that first involves spinning of the filaments and their collection into a tow that comprises numerous filaments. During the spinning step, when molten polymer is pulled away from the face of the spinneret, some drawing of the filament does occur which can also be called the drawdown. This is followed by a second step where the spun fibers are drawn or stretched to increase molecular alignment and crystallinity and to give enhanced strength and other physical properties to the individual filaments. Subsequent steps can include, but are not limited to, heat setting, crimping and cutting of the filament into fibers. The drawing or stretching step can involve drawing the core of the bicomponent fiber, the sheath of the bicomponent fiber or both the core and the sheath of the bicomponent fiber depending on the materials from which the core and sheath are comprised as well as the conditions employed during the drawing or stretching process.

Bicomponent fibers can also be formed in a continuous process where the spinning and drawing are done in a continuous process. During the fiber manufacturing process it is desirable to add various materials to the fiber after the melt spinning step at various subsequent steps in the process. These materials can be referred to as "finish" and be comprised of active agents such as, but not limited to, lubricants and anti-static agents. The finish is typically delivered via an aqueous based solution or emulsion. Finishes can provide desirable properties for both the manufacturing of the bicomponent fiber and for the user of the fiber, for example in an airlaid or wetlaid process.

Numerous other processes are involved before, during and after the spinning and drawing steps and are disclosed in U.S. Pat. Nos. 4,950,541, 5,082,899, 5,126,199, 5,372,885, 5,456,982, 5,705,565, 2,861,319, 2,931,091, 2,989,798, 3,038,235, 3,081,490, 3,117,362, 3,121,254, 3,188,689, 3,237,245, 3,249,669, 3,457,342, 3,466,703, 3,469,279, 3,500,498, 3,585,685, 3,163,170, 3,692,423, 3,716,317, 3,778,208, 3,787,162, 3,814,561, 3,963,406, 3,992,499, 4,052,146, 4,251,200, 4,350,006, 4,370,114, 4,406,850, 4,445,833, 4,717,325, 4,743,189, 5,162,074, 5,256,050, 5,505,889, 5,582,913, and 6,670,035, all of which are hereby incorporated by reference in their entireties.

The presently disclosed subject matter can also include, but are not limited to, articles that contain bicomponent fibers that are partially drawn with varying degrees of draw or stretch, highly drawn bicomponent fibers and mixtures thereof. These can include, but are not limited to, a highly drawn polyester core bicomponent fiber with a variety of sheath materials, specifically including a polyethylene sheath such as Trevira-255 (Varde, Denmark) or a highly drawn polypropylene core bicomponent fiber with a variety of sheath materials, specifically including a polyethylene sheath such as ES FiberVisions AL-Adhesion-C (Varde, Denmark). Additionally, Trevira T265 bicomponent fiber (Varde, Denmark), having a partially drawn core with a core made of polybutylene terephthalate (PBT) and a sheath made of polyethylene can be used. The use of both partially drawn and highly drawn bicomponent fibers in the same structure can be leveraged to meet specific physical and performance properties based on how they are incorporated into the structure.

The bicomponent fibers of the presently disclosed subject matter are not limited in scope to any specific polymers for either the core or the sheath as any partially drawn core bicomponent fiber can provide enhanced performance regarding elongation and strength. The degree to which the partially drawn bicomponent fibers are drawn is not limited in scope as different degrees of drawing will yield different enhancements in performance. The scope of the partially drawn bicomponent fibers encompasses fibers with various core sheath configurations including, but not limited to concentric, eccentric, side by side, islands in a sea, pie segments and other variations. The relative weight percentages of the core and sheath components of the total fiber can be varied. In addition, the scope of this subject matter covers the use of partially drawn homopolymers such as polyester, polypropylene, nylon, and other melt spinnable polymers. The scope of this subject matter also covers multicomponent fibers that can have more than two polymers as part of the fiber structure.

Cellulose Fibers

Any cellulose fibers known in the art, including cellulose fibers of any natural origin, such as those derived from wood pulp or regenerated cellulose, can be used in a cellulose fiber layer. In certain embodiments, cellulose fibers include, but are not limited to, digested fibers, such as kraft, prehydrolyzed kraft, soda, sulfite, chemi-thermal mechanical, and thermo-mechanical treated fibers, derived from softwood, hardwood or cotton linters. In other embodiments, cellulose fibers include, but are not limited to, kraft digested fibers, including prehydrolyzed kraft digested fibers. In certain embodiments, the cellulosic fibers include bonded natural cellulosic fibers.

Non-limiting examples of cellulose fibers suitable for use in this subject matter are the cellulose fibers derived from softwoods, such as pines, firs, and spruces. Other suitable cellulose fibers include, but are not limited to, those derived from Esparto grass, bagasse, kemp, flax, hemp, kenaf, and other lignaceous and cellulosic fiber sources. Suitable cellulose fibers include, but are not limited to, bleached Kraft southern pine fibers sold under the trademark FOLEY FLUFFSR (available from GP Cellulose).

The nonwoven material of the disclosed subject matter can also include, but is not limited to, a commercially available bright fluff pulp including, but not limited to, southern softwood kraft (such as Golden Isles® 4725 from GP Cellulose) or southern softwood fluff pulp (such as Treated FOLEY FLUFFSR or Golden Isles® 4723 from GP Cellulose), northern softwood sulfite pulp (such as T 730 from Weyerhaeuser), or hardwood pulp (such as eucalyptus). While certain pulps may be preferred based on a variety of factors, any cellulosic fluff pulp or mixtures thereof can be used. In certain embodiments, wood cellulose, cotton linter pulp, chemically modified cellulose such as cross-linked cellulose fibers and highly purified cellulose fibers can be used. Non-limiting examples of additional pulps are FOLEY FLUFFSR FFTAS (also known as FFTAS or GP Cellulose FFT-AS pulp), and Weyco CF401.

In certain embodiments, fine fibers, such as certain softwood fibers can be used. Certain non-limiting examples of such fine fibers, with pulp fiber coarseness properties are provided in Table 1 with reference to Watson, P., et al., Canadian Pulp Fibre Morphology: Superiority and Considerations for End Use Potential, The Forestry Chronicle, Vol. 85 No. 3, 401-408 May/June 2009.

TABLE 1

Softwood Fibers

| Species | Pulp Fiber Coarseness (mg/100 m) |
|---|---|
| Coastal Douglas-fir | 24 |
| Western hemlock | 20 |
| Spruce/pine | 18 |
| Western redcedar | 16 |
| Southern pine | 30 |
| Radiata pine | 22 |
| Scandinavian pine | 20 |
| Black spruce | 18 |

In certain embodiments, fine fibers, such as certain hardwood fibers can be used. Certain non-limiting examples of such fine fibers, with pulp fiber coarseness properties are provided in Table 2 with reference, at least in part, to Horn, R., Morphology of Pulp Fiber from Hardwoods and Influence on Paper Strength, Research Paper FPL 312, Forest Products Laboratory, U.S. Department of Agriculture (1978) and Bleached Eucalyptus Kraft Pulp ECF Technical Sheet (April 2017) (available at: https://www.metsafibre.com/en/Documents/Data-sheets/Cenibra-euca-Eucalyptus.pdf).

TABLE 2

Hardwood Fibers

| Species | Pulp Fiber Coarseness (mg/100 m) |
|---|---|
| Red alder | 12.38 |
| Aspen | 8.59 |
| American elm | 9.53 |
| Paper birch | 13.08 |
| American beech | 13.10 |
| Shagbark hickory | 10.59 |
| Sugar maple | 7.86 |
| White oak | 14.08 |
| Eucalyptus | 6.5 +/− 2.3 |

In certain embodiments, the cellulosic fibers can have a Kajaani weighted average length of about 1.5 mm or less, about 1.4 mm or less, about 1.3 mm or less, about 1.2 mm or less, about 1.1 mm or less, or about 1.0 mm or less. In certain embodiments, the cellulosic fibers can have a Kajaani weighted average length of between about 0.1 mm and about 1.5 mm, about 0.5 mm and about 1.5 mm, or about 1 mm and about 1.5 mm. In particular embodiments, the cellulosic fibers can have a Kajaani weighted average length of about 0.1 mm, about 0.5 mm, about 1 mm, about 1.1 mm, about 1.2 mm, about 1.3 mm, about 1.4 mm, or about 1.5 mm.

In certain embodiments, the cellulosic fibers can have a coarseness finer than about 15 mg/100 m, about 12 mg/100 m, about 10 mg/100 m, or about 5 mg/100 m. In certain embodiments, the cellulosic fibers can have a coarseness of between about 1 mg/100 m and about 15 mg/100 m, about 5 mg/100 m and about 10 mg/100 m, about 6 mg/100 m and about 10 mg/100 m, or about 4.2 mg/100 m and about 8.8 mg/100 m. In particular embodiments, the cellulosic fibers can have a coarseness of about 1 mg/100 m, about 2 mg/100 m, about 4.2 mg/100 m, about 6.5 mg/100 m, about 7 mg/100 m, about 8.8 mg/100 m, about 10 mg/100 m, about 12 mg/100 m, or about 15 mg/100 m.

In certain embodiments, the cellulosic fibers can have a Kajaani weighted average length of about 1.5 mm or less and a coarseness finer than about 15 mg/100 m. In certain embodiments, the cellulosic fibers can have a Kajaani weighted average length of about 1.5 mm or less and a coarseness finer than about 10 mg/100 m. In particular embodiments, the cellulosic fibers can comprise bonded hardwood natural cellulosic fibers having a Kajaani weighted average length of about 1.5 mm or less and a coarseness finer than about 15 mg/100 m. In particular embodiments, the cellulosic fibers can comprise bonded hardwood natural cellulosic fibers having a Kajaani weighted average length of about 1.5 mm or less and a coarseness finer than about 10 mg/100 m. Structures having fibers, e.g., hardwood fibers, with these parameters allow for high capillary action with slow migration of liquid through the structure.

Binders

In certain non-limiting embodiments, the nonwoven materials described herein can include binders. Suitable binders include, but are not limited to, liquid binders and powder binders. Non-limiting examples of liquid binders include emulsions, solutions, or suspensions of binders. Non-limiting examples of binders include polyethylene powders, copolymer binders, vinylacetate ethylene binders, styrene-butadiene binders, urethanes, urethane-based binders, acrylic binders, thermoplastic binders, natural polymer-based binders, and mixtures thereof.

Suitable binders include, but are not limited to, copolymers, including vinyl-chloride containing copolymers such as Wacker Vinnol 4500, Vinnol 4514, and Vinnol 4530, vinylacetate ethylene ("VAE") copolymers, which can have a stabilizer such as Wacker Vinnapas 192, Wacker Vinnapas EF 539, Wacker Vinnapas EP907, Wacker Vinnapas EP129, Celanese Duroset E130, Celanese Dur-O-Set Elite 130 25-1813 and Celanese Dur-O-Set TX-849, Celanese 75-524A, polyvinyl alcohol-polyvinyl acetate blends such as Wacker Vinac 911, vinyl acetate homopolymers, polyvinyl amines such as BASF Luredur, acrylics, cationic acrylamides, polyacryliamides such as Bercon Berstrength 5040 and Bercon Berstrength 5150, hydroxyethyl cellulose, starch such as National Starch CATO RTM 232, National Starch CATO RTM 255, National Starch Optibond, National Starch Optipro, or National Starch OptiPLUS, guar gum, styrene-butadienes, urethanes, urethane-based binders, thermoplastic binders, acrylic binders, and carboxymethyl cellulose such as Hercules Aqualon CMC. In certain embodiments, the binder is a natural polymer-based binder. Non-limiting examples of natural polymer-based binders include polymers derived from starch, cellulose, chitin, and other polysaccharides.

In certain embodiments, the binder is water-soluble. In one embodiment, the binder is a vinylacetate ethylene copolymer. One non-limiting example of such copolymers is EP907 (Wacker Chemicals, Munich, Germany). Vinnapas EP907 can be applied at a level of about 10% solids incorporating about 0.75% by weight Aerosol OT (Cytec Industries, West Paterson, N.J.), which is an anionic surfactant. Other classes of liquid binders such as styrene-butadiene and acrylic binders can also be used.

In certain embodiments, the binder is not water-soluble. Examples of these binders include, but are not limited to, Vinnapas 124 and 192 (Wacker), which can have an opacifier and whitener, including, but not limited to, titanium dioxide, dispersed in the emulsion. Other binders include, but are not limited to, Celanese Emulsions (Bridgewater, N.J.) Elite 22 and Elite 33.

In certain embodiments, the binder is a thermoplastic binder. Such thermoplastic binders include, but are not limited to, any thermoplastic polymer which can be melted at temperatures which will not extensively damage the cellulose fibers. Preferably, the melting point of the thermoplastic binding material will be less than about 175° C. Examples of suitable thermoplastic materials include, but are not limited to, suspensions of thermoplastic binders and thermoplastic powders. In particular embodiments, the thermoplastic binding material can be, for example, polyethylene, polypropylene, polyvinylchloride, and/or polyvinylidene chloride.

The binder can be non-crosslinkable or crosslinkable. In certain embodiments, the binder is WD4047 urethane-based binder solution supplied by HB Fuller. In one embodiment, the binder is Michem Prime 4983-45N dispersion of ethylene acrylic acid ("EAA") copolymer supplied by Michelman. In certain embodiments, the binder is Dur-O-Set Elite 22LV emulsion of VAE binder supplied by Celanese Emulsions (Bridgewater, N.J.). As noted above, in particular embodiments, the binder is crosslinkable. It is also understood that crosslinkable binders are also known as permanent wet strength binders. A permanent wet-strength binder includes, but is not limited to, Kymene® (Hercules Inc., Wilmington, Del.), Parez® (American Cyanamid Company, Wayne, N.J.), Wacker Vinnapas or AF192 (Wacker Chemie AG, Munich, Germany), or the like. Various permanent wet-strength agents are described in U.S. Pat. Nos. 2,345,543, 2,926,116, and 2,926,154, the disclosures of which are incorporated by reference in their entirety. Other permanent wet-strength binders include, but are not limited to, polyamine-epichlorohydrin, polyamide epichlorohydrin or polyamide-amine epichlorohydrin resins, which are collectively termed "PAE resins". Non-limiting exemplary permanent wet-strength binders include Kymene 557H or Kymene 557LX (Hercules Inc., Wilmington, Del.) and have been described in U.S. Pat. Nos. 3,700,623 and 3,772,076, which are incorporated herein in their entirety by reference thereto.

Alternatively, in certain embodiments, the binder is a temporary wet-strength binder. The temporary wet-strength binders include, but are not limited to, Hercobond® (Hercules Inc., Wilmington, Del.), Parez® 750 (American Cyanamid Company, Wayne, N.J.), Parez® 745 (American Cyanamid Company, Wayne, N.J.), or the like. Other suitable temporary wet-strength binders include, but are not limited to, dialdehyde starch, polyethylene imine, mannogalactan gum, glyoxal, and dialdehyde mannogalactan. Other suitable temporary wet-strength agents are described in U.S. Pat. Nos. 3,556,932, 5,466,337, U.S. U.S. Pat. Nos. 3,556,933, 4,605,702, 4,603,176, 5,935,383, and 6,017,417, all of which are incorporated herein in their entirety by reference thereto.

In certain embodiments, binders are applied as emulsions in amounts ranging from about 1 gsm to about 15 gsm, or from about 2 gsm to about 10 gsm, or from about 3 gsm to about 8 gsm. The emulsion can further include one or more additional components. For example and not limitation, the emulsion can include one or more surfactants in an amount of from about 0.5 wt-% to about 1.5 wt-% or from about 0.5 wt-% to about 1 wt-% based on the total weight of the emulsion. In certain non-limiting embodiments, the emulsion can include one or more surfactants in an amount of about 0.75 wt-% based on the total weight of the emulsion. The binder, whether or not part of the emulsion, can be applied to one side of a fibrous layer, preferably an externally facing layer. Alternatively, binder can be applied to both sides of a layer, in equal or disproportionate amounts.

Other Additives

The materials of the presently disclosed subject matter can also contain other additives. For example, the materials can contain superabsorbent polymer (SAP). The types of superabsorbent polymers which may be used in the disclosed subject matter include, but are not limited to, SAPs in their particulate form such as powder, irregular granules, spherical particles, staple fibers and other elongated particles. U.S. Pat. Nos. 5,147,343; 5,378,528; 5,795,439; 5,807,916; 5,849,211; and 6,403,857, which are hereby incorporated by reference in their entireties, describe various superabsorbent polymers and methods of making superabsorbent polymers. One example of a superabsorbent polymer forming system is crosslinked acrylic copolymers of metal salts of acrylic acid and acrylamide or other monomers such as 2-acrylamido-2-methylpropanesulfonic acid. Many conventional granular superabsorbent polymers are based on poly(acrylic acid) which has been crosslinked during polymerization with any of a number of multi-functional co-monomer crosslinking agents well-known in the art. Examples of multi-functional crosslinking agents are set forth in U.S. Pat. Nos. 2,929,154; 3,224,986; 3,332,909; and 4,076,673, which are incorporated herein by reference in their entireties. For instance, crosslinked carboxylated polyelectrolytes can be used to form superabsorbent polymers. Other water-soluble polyelectrolyte polymers are known to be useful for the preparation of superabsorbents by crosslinking, these polymers include: carboxymethyl starch, carboxymethyl cellulose, chitosan salts, gelatine salts, etc. They are not, however, commonly used on a commercial scale to enhance absorbency of dispensable absorbent articles mainly due to their higher cost. Superabsorbent polymer granules useful in the practice of this subject matter are commercially available from a number of manufacturers, such as BASF, Dow Chemical (Midland, Mich.), Stockhausen (Greensboro, N.C.), Chemdal (Arlington Heights, Ill.), and Evonik (Essen, Germany). Non-limiting examples of SAP include a surface crosslinked acrylic acid-based powder such as Stockhausen 9350 or SX70, BASF HySorb FEM 33N, or Evonik Favor SXM 7900.

In certain embodiments, SAP can be used in a layer in amounts ranging from about 5 wt-% to about 100 wt-% based on the total weight of the structure. In particular embodiments, a layer comprising 100 wt-% SAP can be disposed between two adjacent layers containing fibers. In certain embodiments, the amount of SAP in a layer can range from about 10 gsm to about 60 gsm, or from about 20 gsm to about 50 gsm, or from about 30 gsm to about 40 gsm. In particular embodiments, the amount of SAP in an layer can be about 10 gsm, about 20 gsm, about 30 gsm, about 40 gsm, about 50 gsm, or about 60 gsm.

Nonwoven Material

The presently disclosed subject matter provides for a nonwoven material that incorporates cellulosic fibers. The nonwoven material can further include synthetic fibers. As embodied herein, the nonwoven material can include at least one layer, at least two layers, or at least three layers. In certain non-limiting embodiments, the nonwoven material includes more than three layers. In certain non-limiting embodiments, the nonwoven material includes at least one layer.

As embodied herein, the nonwoven material can be an airlaid material. For example, and not by limitation, the material can be a thermally bonded airlaid (TBAL) material comprising cellulose fibers. In certain non-limiting embodiments, the material can be a multi-bonded airlaid (MBAL) material comprising cellulose fibers. The material can further include a binder.

In certain non-limiting embodiments, the nonwoven material can include a single layer comprising cellulose fibers. For example and not by limitation, the single layer can include cellulose fibers in an amount from about 75 wt-% to about 90 wt-%. In certain non-limiting embodiments, the single layer can include about 75 wt-% to about 85 wt-%, about 75 wt-% to about 80 wt-%, about 80 wt-% to about 90 wt-%, about 85 wt-% to about 90 wt-% cellulose fibers. In certain non-limiting embodiments, the single layer can include about 75 wt-%, about 77 wt-%, about 80 wt-%, about 82 wt-%, about 85 wt-%, or about 90 wt-% cellulose fibers. The cellulose fibers can comprise eucalyptus pulp. The single layer can further include additional fiber types. The single layer can further include synthetic fibers. For example and not by limitation, the single layer can include synthetic fibers in an amount from about 10 wt-% to about 20 wt-%. In certain non-limiting embodiments, the single layer can include about 10 wt-% to about 15 wt-% or about 15 wt-% to about 20 wt-% synthetic fibers. In certain non-limiting embodiments, the single layer includes about 10 wt-%, about 12 wt-%, about 15 wt-%, about 18 wt-%, or about 20 wt-% synthetic fibers. The synthetic fibers can comprise bicomponent binder fibers, eccentric bicomponent binder fibers, or a combination thereof. In certain non-limiting embodiments, the single layer can comprise about 10 wt-% to about 25 wt-% synthetic fibers and about 75 wt-% to about 90 wt-% cellulose fibers. In certain non-limiting embodiments, the single layer can comprise about 15 wt-% to about 20 wt-% synthetic fibers and about 80 wt-% to about 85 wt-% cellulose fibers. In certain other non-limiting embodiments, the single layer can comprise about 82 wt-% cellulose and about 18 wt-% synthetic fibers. In certain non-limiting embodiments, the single layer nonwoven can further include super absorbent polymer (SAP), for example, to increase liquid capacity and slow the release of absorbed liquid. Thus, providing a metered release of a liquid.

In certain non-limiting embodiments, the nonwoven material can include at least two layers. In certain non-limiting embodiments, the two layers can be adjacent to each other. The two layers can have identical or different compositions from each other. In certain non-limiting embodiments at least one layer can comprise cellulose fibers and synthetic fibers. For example and not by limitation, the at least one layer can include cellulose fibers in an amount from about 75 wt-% to about 90 wt-%. In certain non-limiting embodiments, the at least one layer can include about 75 wt-% to about 85 wt-%, about 75 wt-% to about 80 wt-%, about 80 wt-% to about 90 wt-%, about 85 wt-% to about 90 wt-% cellulose fibers. In certain non-limiting embodiments, the at least one layer can include about 75 wt-%, about 77 wt-%, about 80 wt-%, about 82 wt-%, about 85 wt-%, or about 90 wt-% cellulose fibers. The cellulose fibers can comprise eucalyptus pulp. For example and not by limitation, the at least one layer can also include synthetic fibers in an amount from about 10 wt-% to about 20 wt-%. In certain non-limiting embodiments, the single layer can include about 10 wt-% to about 15 wt-% or about 15 wt-% to about 20 wt-% synthetic fibers. In certain non-limiting embodiments, the at least one layer includes about 10 wt-%, about 12 wt-%, about 15 wt-%, about 18 wt-%, or about 20 wt-% synthetic fibers. The synthetic fibers can comprise bicomponent binder fibers, eccentric bicomponent binder fibers, or a combination thereof. In certain non-limiting embodiments, at least one layer can comprise about 10 wt-% to about 25 wt-% synthetic fibers and about 75 wt-% to about 90 wt-% cellulose fibers. In certain non-limiting embodiments, at least one layer can comprise about 15 wt-% to about 20 wt-% synthetic fibers and about 80 wt-% to about 85 wt-% cellulose fibers. In certain non-limiting embodiments, at least one layer can include about 82 wt-% cellulose fibers and about 18 wt-% synthetic fibers. In certain non-limiting embodiments, at least one layer can comprise bicomponent binder fibers or eccentric bicomponent binder fibers. For example, in certain non-limiting embodiments, in addition to the at least one layer including cellulose fibers and synthetic fibers, the nonwoven material including at least two layers can include a layer including synthetic fibers. For example, the layer including synthetic fibers can include about 100 wt-% synthetic fibers. In certain non-limiting embodiments, the nonwoven material having at least two layers can include a layer including cellulose fibers and synthetic fibers and a layer including synthetic fibers. For example, the nonwoven material having at least two layers can include one layer including cellulose fibers and synthetic fibers and one layer including only synthetic fibers. Additionally, a binder can be applied to a surface of the structure, for example, a bottom surface of the structure. In certain non-limiting embodiments, the two-layer nonwoven can further include super absorbent polymer (SAP), for example, to increase liquid capacity and slow the release of absorbed liquid.

In certain non-limiting embodiments, the nonwoven material can include at least three layers. In certain non-limiting embodiments, the at least three layers can be provided adjacent to each other. The at least three layers can each have identical or different compositions from each other. In certain non-limiting embodiments, each of the layers can include cellulose fibers and bicomponent synthetic fibers. For example and not by limitation, one or more layers can include cellulose fibers in an amount from about 75 wt-% to about 90 wt-%. In certain non-limiting embodiments, one or more layers can include about 75 wt-% to about 85 wt-%, about 75 wt-% to about 80 wt-%, about 80 wt-% to about 90 wt-%, about 85 wt-% to about 90 wt-% cellulose fibers. In certain non-limiting embodiments, one or more layers can include about 75 wt-%, about 77 wt-%, about 80 wt-%, about 82 wt-%, about 85 wt-%, or about 90 wt-% cellulose fibers. The cellulose fibers can comprise eucalyptus pulp. For example and not by limitation, one or more layers can include synthetic fibers in an amount from about 10 wt-% to about 20 wt-%. In certain non-limiting embodiments, one or more layers can include about 10 wt-% to about 15 wt-% or about 15 wt-% to about 20 wt-% synthetic fibers. In certain non-limiting embodiments, one or more layers can include about 10 wt-%, about 12 wt-%, about 15 wt-%, about 18 wt-%, or about 20 wt-% synthetic fibers. The synthetic fibers can comprise bicomponent binder fibers, eccentric bicomponent binder fibers, or a combination thereof. In certain non-limiting embodiments, one or more layers can include about 10 wt-% to about 25 wt-% synthetic fibers and about 75 wt-% to about 90 wt-% cellulose fibers. In certain non-limiting embodiments, one or more layers can include about 15 wt-% to about 20 wt-% weight percent synthetic fibers and about 80 wt-% to about 85 wt-% cellulose fibers. In certain non-limiting embodiments, one or more layers can include about 82 wt-% cellulose fibers and about 18 wt-% synthetic fibers.

In certain non-limiting embodiments, the nonwoven material can include at least three layers having at least two layers including cellulose fibers and bicomponent synthetic fibers and at least one layer including synthetic fibers. For example, the at least one layer including synthetic fibers can include about 100 wt-% synthetic fibers. In certain non-limiting embodiments, the nonwoven material having at least three layers can include two layers including cellulose fibers and synthetic fibers and a layer including synthetic fibers. For example, the nonwoven material having at least three layers can include two layers including cellulose fibers and synthetic fibers and one layer including only synthetic fibers. Additionally, the at least two layers comprising cellulose fibers can comprise eucalyptus pulp. The at least three layers comprising synthetic fibers can comprise bicomponent binder fibers, eccentric bicomponent binder fibers, or a combination thereof. In certain non-limiting embodiments, the at least two layers can each comprise about 10 wt-% to about 25 wt-% synthetic fibers and about 75 wt-% to about 90 wt-% cellulose fibers. In certain non-limiting embodiments, the at least two layers can comprise about 15 wt-% to about 20 wt-% synthetic fibers and about 80 wt-% to about 85 wt-% cellulose fibers. In certain non-limiting embodiments, the at least two layers can comprise about 82 wt-% cellulose fibers and about 18 wt-% synthetic fibers. Additionally, a binder can be applied to a surface of the structure, for example, a bottom surface of the structure. In certain non-limiting embodiments, the three-layer nonwoven can further include super absorbent polymer (SAP), for example, to increase liquid capacity and slow the release of absorbed liquid. In certain non-limiting embodiments, a tacky adhesive can be provided on at least a portion of the structure. For example, about 0 gsm to about 6 gsm of a tacky adhesive can be added to the structure. In certain non-limiting embodiments, the structure can include a tacky adhesive in an about from about 0 gsm to about 6 gsm, about 0 gsm, to about 5 gsm, about 0 gsm to about 4 gsm, about 0 gsm to about 3 gsm, about 0 gsm to about 2 gsm, about 1 gsm to about 6 gsm, about 1 gsm to about 5 gsm, about 1 gsm to about 4 gsm, about 1 gsm to about 3 gsm, about 1 gsm to about 2 gsm, about 2 gsm to about 6 gsm, about 2 gsm to about 5 gsm, about 2 gsm to about 4 gsm, about 2 gsm to about 3 gsm, about 3 gsm to about 6 gsm, about 3 gsm to about 5 gsm, about 3 gsm to about 4 gsm, about 4 gsm to about 6 gsm, about 4 gsm to about 5 gsm, or about 5 gsm to about 6 gsm. In certain non-limiting embodiments, the structure can include a tacky adhesive in an amount of about 1 gsm, about 2 gsm, about 3 gsm, about 4 gsm, about 5 gsm, or about 6 gsm.

Additionally or alternatively, the structure can be coated on at least of a portion of its outer surface with a binder. The binder does not need to chemically bond with a portion of the layer, although it is preferred that the binder remain associated in close proximity with the layer, by coating, adhering, precipitation, or any other mechanism such that it is not dislodged from the layer during normal handling of the layer. For convenience, the association between the layer and the binder discussed above can be referred to as the bond, and the compound can be said to be bonded to the layer. If present, the binder can be applied in amounts ranging from about 1 gsm to about 15 gsm, or from about 2 gsm to about 10 gsm, or from about 2 gsm to about 8 gsm, or from about 3 gsm to about 5 gsm.

Overall, the first layer can have a basis weight of from about 20 gsm to about 130 gsm, or from about 35 gsm to about 100 gsm, or from about 40 gsm to about 80 gsm, or from about 45 gsm to about 60 gsm. When the first layer includes a blend of cellulosic fibers and synthetic fibers, the cellulosic fibers can be present in an amount of from about 10 wt-% to about 25 wt-% synthetic fibers and about 75 to about 90 wt-% cellulose fibers, or from about 15 wt-% to about 20 wt-% synthetic fibers and from about 80 wt-% to about 85 wt-% cellulose fibers, or from about 82 wt-% cellulose fibers and about 18 wt-% synthetic fibers. Alternatively, the first layer can include synthetic fibers. For example, the first layer can include about 100 wt-% synthetic fibers.

In these embodiments, the second layer, comprising cellulose fibers and synthetic fibers, can have a basis weight of from about 35 gsm to about 110 gsm, from about 40 gsm to about 105 gsm, from about 45 gsm, to about 85 gsm, or from about 50 gsm to about 75 gsm. When the second layer includes a blend of cellulosic fibers and synthetic fibers, the cellulosic fibers can be present in an amount of from about 10 wt-% to about 25 wt-% synthetic fibers and about 75 wt-% to about 90 wt-% cellulose fibers, or from about 15 wt-% to about 20 wt-% synthetic fibers and from about 80 wt-% to about 85 wt-% cellulose fibers, or from about 82 wt-% cellulose fibers and about 18 wt-% synthetic fibers.

The material can optionally include a third layer, disposed between the first layer and the second layer, comprising cellulose fibers and synthetic fibers, which can have a basis weight of from about 30 gsm to about 140 gsm, or from about 35 gsm to about 130 gsm, or from about 40 gsm to about 100 gsm, or from about 45 gsm to about 75 gsm. When the third layer includes a blend of cellulosic fibers and synthetic fibers, the cellulosic fibers can be present in an amount of from about 10 wt-% to about 25 wt-% synthetic fibers and about 75 wt-% to about 90 wt-% cellulose fibers, or from about 15 wt-% to about 20 wt-% synthetic fibers and from about 80 wt-% to about 85 wt-% cellulose fibers, or from about 82 wt-% cellulose fibers and about 18 wt-% synthetic fibers.

Methods of Making the Nonwoven Material

A variety of processes can be used to assemble the materials used in the practice of this disclosed subject matter to produce the materials, including but not limited to, traditional dry forming processes such as airlaying and carding or other forming technologies such as spunlace or airlace. Preferably, the materials can be prepared by airlaid processes. Airlaid processes include, but are not limited to, the use of one or more forming heads to deposit raw materials of differing compositions in selected order in the manufacturing process to produce a product with distinct strata. This allows great versatility in the variety of products which can be produced.

In one embodiment, the material is prepared as a continuous airlaid web. The airlaid web is typically prepared by disintegrating or defiberizing a cellulose pulp sheet or sheets, typically by hammermill, to provide individualized fibers. Rather than a pulp sheet of virgin fiber, the hammermills or other disintegrators can be fed with recycled airlaid edge trimmings and off-specification transitional material produced during grade changes and other airlaid production waste. Being able to thereby recycle production waste would contribute to improved economics for the overall process. The individualized fibers from whichever source, virgin or recycled, are then air conveyed to forming heads on the airlaid web-forming machine. A number of manufacturers make airlaid web forming machines suitable for use in the disclosed subject matter, including Dan-Web Forming of Aarhus, Denmark, M&J Fibretech A/S of Horsens, Denmark, Rando Machine Corporation, Macedon, N.Y. which is described in U.S. Pat. No. 3,972,092, Margasa Textile Machinery of Cerdanyola del Valles, Spain, and DOA International of Wels, Austria. While these many forming machines differ in how the fiber is opened and air-conveyed to the forming wire, they all are capable of producing the webs of the presently disclosed subject matter. The Dan-Web forming heads include rotating or agitated perforated drums, which serve to maintain fiber separation until the fibers are pulled by vacuum onto a foraminous forming conveyor or forming wire. In the M&J machine, the forming head is basically a rotary agitator above a screen. The rotary agitator may comprise a series or cluster of rotating propellers or fan blades. Other fibers, such as a synthetic thermoplastic fiber, are opened, weighed, and mixed in a fiber dosing system such as a textile feeder supplied by Laroche S. A. of Cours-La Ville, France. From the textile feeder, the fibers are air conveyed to the forming heads of the airlaid machine where they are further mixed with the comminuted cellulose pulp fibers from the hammer mills and deposited on the continuously moving forming wire. Where defined layers are desired, separate forming heads may be used for each type of fiber. Alternatively or additionally, one or more layers can be prefabricated prior to being combined with additional layers, if any. In certain embodiments, the forming wire can be patterned, such that at least one layer of the resulting nonwoven material is patterned.

The airlaid web is transferred from the forming wire to a calendar or other densification stage to densify the web, if necessary, to increase its strength and control web thickness. In one embodiment, the fibers of the web are then bonded by passage through an oven set to a temperature high enough to fuse the included thermoplastic or other binder materials. In a further embodiment, secondary binding from the drying or curing of a latex spray or foam application occurs in the same oven. The oven can be a conventional through-air oven, be operated as a convection oven, or may achieve the necessary heating by infrared or even microwave irradiation. In particular embodiments, the airlaid web can be treated with additional additives before or after heat curing. The airlaid web can optionally be embossed or otherwise patterned. Subsequently, the airlaid web can be rolled into bale on a roller.

Applications and Features of the Nonwoven Material

The nonwoven materials of the disclosed subject matter can be used for any application as known in the art. The nonwoven materials can be used alone or as a component in other consumer products. For example, the nonwoven materials can be used either alone or as a component in a variety of absorbent articles including cleaning articles, personal care wipes, baby diapers, adult incontinence products, sanitary napkins and the like. Absorbent cleaning products include wipes, sheets, towels, and the like. The absorbency of the nonwoven materials can aid in dirt and mess removal in such cleaning applications. In certain aspects, the layered structure of the disclosed nonwoven material can provide a dual-sided substrate suitable for use as wipes, sheets, towels, and the like.

The use of cellulosic fibers having a Kajaani weighted average length shorter than about 1.5 mm and a coarseness finer than about 15 mg/100 m and therefore having high capillary action allows for slow migration of liquid through the structure. In a dry state, the layer including cellulosic fibers having the parameters described above distributes the liquid throughout the structure and prevents rapid release of the liquid due to high capillary action. Therefore, the nonwoven materials described herein can be used as highly absorbent materials for cleaning liquids.

In certain aspects, the present disclosure relates to nonwoven materials having increased performance as a cleaning apparatus. The nonwoven materials described herein can also be used in pre-moistened cleaning materials. Since the nonwoven materials described herein have high capillary action allowing for a metered release of absorbed liquids, a single pre-moistened wipe including these nonwoven materials can be used to clean a larger surface area.

Additionally, the material can be designed such that an outer layer that contacts the surface to be cleaned can comprise bonded synthetic fibers. The bonded synthetic fibers can provide increased article pick-up and allow an outer surface to provide a scrubbing surface.

In certain non-limiting embodiments, the nonwoven is a multi-layer unitary absorbent material whose individual layers have specific characteristics and is a medium by which typical cleaning formulations used for cleaning hard surfaces (e.g., liquid or lotions) can be metered onto or absorbed from a surface to be cleaned.

In certain non-limiting embodiments, the layer adjacent to a floor side comprises eucalyptus fibers that aid to release and distribute the liquid, while other layers serve as to store a liquid. In certain non-limiting embodiments, the intermediate layer disposed between a first and a second outer layer comprises eucalyptus fibers and provides a metered release of the liquid.

As noted above, in certain non-limiting embodiments, the nonwoven materials of the present disclosure can be used in conjunction of a variety of cleaning formulations (e.g., liquids or lotions) known in the art. Such cleaning formulations can be in the form of a solution or emulsion. In certain embodiments, the cleaning formulation is aqueous based. In a particular non-limiting embodiment, the cleaning formulation is non-aqueous based.

6. EXAMPLES

The following examples are merely illustrative of the presently disclosed subject matter and they should not be considered as limiting the scope of the disclosed subject matter in any way.

Example 1: Multi-Layer Unitary Absorbent Nonwoven Materials for Liquid Retention and Metered Liquid Release The present Example provides multi-layer nonwoven substrates that can retain liquid and provide a metered release of liquid. Different compositions were prepared and tested as follows. In this Example, nonwoven substrates having multiple layers were formed and tested for liquid retention. A Control Sample and Samples 1 to 3 were cut into samples measuring 10 in.×4 in. (10 in. being the machine direction). The samples were placed in the center of a 50 gsm spunlace (wing) (10 in.×8.5 in. dimensions). A 45 gsm spunlace (cover stock) (10 in.×5 in. dimensions) was placed over the substrate. The layers of the samples were embossed together using an embossing plate and Carver press. The samples were then weighed.

The compositions of the Control Sample and Samples 1 to 3 are shown in Tables 3-6, below.

TABLE 3

| Control Sample Composition | | | |
|---|---|---|---|
| Layer | Type of Material | Raw Materials | Basis Weight (gsm) |
| Top Floor Sweeping Tool Side | Pulp | Leaf River Semi-Treated 4725 | 34.16 |
|  | Synthetic Fiber | Trevira T257 PEPP 1.7 dtex | 7.50 |
| Middle | Pulp | Leaf River Semi-Treated 4725 | 34.16 |
|  | Synthetic Fiber | Trevira T257 PEPP 1.7 dtex | 7.50 |
| Bottom Floor side | Pulp | Leaf River Semi-Treated 4725 | 34.16 |
|  | Synthetic Fiber | Trevira T257 PEPP 1.7 dtex | 7.50 |
|  |  | Total | 125.0 |

The Control Sample was prepared and tested for comparative purposes. The Control Sample was constructed with three homogeneous layers each including cellulose and synthetic fibers. The substrate was a 125 gsm thermal-bonded Dan-Web Airlaid Nonwoven (TBAL) product with 18 wt-% bicomponent synthetic fibers. The Control Sample included three homogeneous layers. Each layer included 34.16 gsm of cellulose (GP 4725, semi-treated pulp made by Georgia-Pacific) blended with 7.5 gsm of synthetic fibers (Trevira Type 257-1.7 dtex 6 mm). The total weight of the structure was calculated to be 125.0 gsm.

TABLE 4

| Sample 1 Composition | | | |
|---|---|---|---|
| Layer | Type of Material | Raw Materials | Basis Weight (gsm) |
| Top Floor Sweeping Tool Side | Pulp | Leaf River Semi-Treated 4725 | 30.75 |
|  | Synthetic Fiber | Trevira T255 1661 2.2 dtex | 6.75 |
| Middle | Pulp | Leaf River Semi-Treated 4725 | 30.75 |
|  | Synthetic Fiber | Trevira T255 1661 2.2 dtex | 6.75 |
| Bottom Floor side | Pulp | Leaf River Semi-Treated 4725 | 41.00 |
|  | Synthetic Fiber | Trevira T255 1661 2.2 dtex | 9.00 |
|  |  | Total | 125.0 |

Sample 1 was constructed with three homogeneous layers each including cellulose and synthetic fibers. The substrate is a 125 gsm thermal-bonded Dan-Web Airlaid Nonwoven (TBAL) product with 18 wt-% bicomponent synthetic fibers. Sample 1 included three layers. The bottom layer contained 40 percent of the overall structure. The bottom layer contained 41 gsm of cellulose (GP 4725, semi-treated pulp made by Georgia-Pacific) and 9 gsm synthetic fibers (Trevira Type 255-2.2 dtex 6 mm). The top and middle layers each contained 30.75 gsm of cellulose (GP 4725, semi-treated pulp made by Georgia-Pacific) and 6.75 gsm synthetic fibers (Trevira Type 255-2.2 dtex 6 mm). The total weight of the structure was calculated to be 125.0 gsm.

TABLE 5

Sample 2 Composition

| Layer | Type of Material | Raw Materials | Basis Weight (gsm) |
|---|---|---|---|
| Top | Pulp | Leaf River Semi-Treated 4725 | 30.75 |
| Floor Sweeping Tool Side | Synthetic Fiber | Trevira T255 1661 2.2 dtex | 6.75 |
| Middle | Pulp | Leaf River Semi-Treated 4725 | 30.75 |
|  | Synthetic Fiber | Trevira T255 1661 2.2 dtex | 6.75 |
| Bottom | Pulp | Eucalyptus CFU | 41.00 |
| Floor side | Synthetic Fiber | Trevira T255 1661 2.2 dtex | 9.00 |
|  |  | Total | 125.0 |

Sample 2 was constructed with three homogeneous layers each including cellulose and synthetic fibers. The substrate is a 125 gsm thermal-bonded Dan-Web Airlaid Nonwoven (TBAL) product with 18 wt-% bicomponent synthetic fibers. Sample 2 included three layers. The bottom layer contained 40 percent of the overall structure. The bottom layer contained 41 gsm of eucalyptus pulp (Suzano, untreated) and 9 gsm synthetic fibers (Trevira Type 255-2.2 dtex 6 mm). The top and middle layers each contained 30.75 gsm of cellulose (GP 4725, semi-treated pulp made by Georgia-Pacific) and 6.75 gsm synthetic fibers (Trevira Type 255-2.2 dtex 6 mm). The total weight of the structure was calculated to be 125.0 gsm.

TABLE 6

Sample 3 Composition

| Layer | Type of Material | Raw Materials | Basis Weight (gsm) |
|---|---|---|---|
| Top | Pulp | Eucalyptus CFU | 35.53 |
| Floor Sweeping Tool Side | Synthetic Fiber | Trevira T255 4703 1.5 dtex | 7.80 |
| Middle | Pulp | Leaf River Semi-Treated 4725 | 35.53 |
|  | Synthetic Fiber | Trevira T255 4743 1.7 dtex | 7.80 |
| Bottom | Pulp | Eucalyptus CFU | 35.53 |
| Floor side | Synthetic Fiber | Trevira T255 4703 1.5 dtex | 7.80 |
|  |  | Total | 130.0 |

Sample 3 was constructed with three homogeneous layers each including cellulose and synthetic fibers. The substrate is a 130 gsm thermal-bonded Dan-Web Airlaid Nonwoven (TBAL) product with 18 wt-% bicomponent synthetic fibers. Sample 3 included three layers. The top and bottom layers each contained 35.53 gsm of eucalyptus pulp (Suzano, untreated) and 7.8 gsm synthetic fibers (Trevira Type 255-1.5 dtex 6 mm). The middle layer contained 35.53 gsm of cellulose (GP 4725, semi-treated pulp made by Georgia-Pacific) and 7.8 gsm synthetic fibers (Trevira Type 255-1.7 dtex 6 mm). The total weight of the structure was calculated to be 130.0 gsm.

Example 2: Multi-Layer Unitary, Absorbent Structure Used for Storage and Metered Release of Liquid with Eucalyptus in the Bottom or Middle Layer and Eccentric Bicomponent Fibers on the Top Samples 4 and 5 were prepared and tested for liquid retention. Samples 4 and 5 are unitary, absorbent composites composed of three layers, stacked one on another, and are designed to store liquid, provide a measured release of liquid, and replace spunlace that is used in commercially available disposable wet mopping cloths. Binder was applied to the bottom of the structures. The substrate was cut into about 10 in.×9 in. samples (10 in. being the machine direction). Some of the 10 in.×9 in. samples were unembossed and were approximately 3.5 mm thick. Some of the 10 in.×9 in. samples were embossed with a pattern to a thickness of approximately 2.25 mm. The compositions of Samples 4 and 5 are shown in Tables 7 and 8, respectively.

TABLE 7

Sample 4 Composition

| Layer | Type of Material | Raw Materials | Basis Weight (gsm) |
| --- | --- | --- | --- |
| Top | Pulp | | |
| Floor Side | Synthetic Fiber | Trevira T255 6.7 dtex eccentric | 25.00 |
| Middle | Pulp | Leaf River Fully-Treated 4723 | 70.00 |
| | Synthetic Fiber | Trevira T255 4743 1.7 dtex | 30.00 |
| Bottom | Pulp | Eucalyptus CFU | 62.00 |
| Floor Sweeping Tool side | Synthetic Fiber | Trevira T255 4703 1.5 dtex | 8.00 |
| | Binder | Wacker Vinnapas 192 | 5.00 |
| | | Total | 200.0 |

Sample 4 was constructed with three homogeneous layers with two layers including cellulose and synthetic fibers and one layer including synthetic fibers. The substrate is a 200 gsm multi-bonded Dan-Web Airlaid Nonwoven (MBAL) product with 31.5 percent bicomponent synthetic fibers and 2.5 percent binder. Sample 4 included three layers. The bottom layer contained 62 gsm of eucalyptus pulp (Suzano, untreated) and 8 gsm synthetic fibers (Trevira Type 255-1.5 dtex 6 mm). The middle layer contained 70 gsm of cellulose (GP 4723, fully-treated pulp made by Georgia-Pacific) and 30 gsm synthetic fibers (Trevira Type 255-1.7 dtex 6 mm). The top layer contained 25 gsm of eccentric bicomponent fibers (Trevira Type 255-6.7 dtex 5 mm). The binder, 5 gsm (Wacker Vinnapas 192), was applied to the bottom (floor sweeping tool side) of the structure. The total weight of the structure was calculated to be 200.0 gsm.

TABLE 8

Sample 5 Composition

| Layer | Type of Material | Raw Materials | Basis Weight (gsm) |
| --- | --- | --- | --- |
| Top | Pulp | | |
| Floor Side | Synthetic Fiber | Trevira T255 6.7 dtex eccentric | 25.00 |
| Middle | Pulp | Eucalyptus CFU | 62.00 |
| | Synthetic Fiber | Trevira T255 4703 1.5 dtex | 8.00 |
| Bottom Floor | Pulp | Leaf River Fully-Treated 4723 | 70.00 |
| Sweeping Tool side | Synthetic Fiber | Trevira T255 4743 1.7 dtex | 30.00 |
| | Binder | Wacker Vinnapas 192 | 5.00 |
| | | Total | 200.0 |

Sample 5 was constructed with three homogeneous layers with two layers including cellulose and synthetic fibers and one layer including synthetic fibers. The substrate is a 200 gsm multi-bonded Dan-Web Airlaid Nonwoven (MBAL) product with 31.5 percent bicomponent synthetic fibers and 2.5 percent binder. Sample 5 included three layers. The bottom layer contained 70 gsm of cellulose (GP 4723, fully-treated pulp made by Georgia-Pacific) and 30 gsm synthetic fibers (Trevira Type 255-1.7 dtex 6 mm). The middle layer contained 62 gsm of eucalyptus pulp (Suzano, untreated) and 8 gsm synthetic fibers (Trevira Type 255-1.5 dtex 6 mm). The top layer contained 25 gsm of eccentric bicomponent fibers (Trevira Type 255-6.7 dtex 5 mm). The binder, 5 gsm (Wacker Vinnapas 192), was applied to the bottom (floor sweeping tool side) of the structure. The total weight of the structure was calculated to be 200.0 gsm.

Example 3: Release of Liquid Study

A study to quantitatively measure the release of a liquid or lotion from pre-moistened substrates was conducted to assess the amount of released from the wipes during cleaning.

Control Sample and Samples 1-5 were tested on an apparatus as shown in FIG. 1. Sample 4 and Sample 5 were each tested embossed and unembossed. The apparatus included a flooring substrate fixture demonstrating an oak hardwood floor covering measuring approximately 91.44 cm (3 ft) by 91.44 cm (3 ft) and is surrounded by 7.62 cm (3 in.) tall wood baseboards in front of 25.40 cm (10 in.) walls on three sides of the perimeter. To measure release of liquid from each substrate, the substrate was cut in sample sizes and lotion in an amount of about 6.5 to about 7 times the substrate weight was added. The lotion had been extracted from pre-moistened wet mopping cloth wipes (Walmart® Great Value Wet Mopping Cloth wipes). The lotion was poured on the sample using a beaker, and a 526-gram steel roll was rolled over the sample to distribute the lotion evenly throughout the sample. The sample was then loaded onto a floor sweeping tool. For the Control Sample and Samples 1-3, the sweeping tool was then placed on the wet sample and a spunlace wing was wrapped around and secured into the holding ports on top of a manual sweeping tool head. The spunlace cover stock was touching the floor. The entire sweeping tool head and sample were weighed. For Sample 4 and Sample 5, a manual sweeping tool head was placed on a wet sample and the sample was wrapped around the sweeping tool head and secured into the holding ports on top. The entire sweeping tool head and sample were weighed.

The sweeping tool head was loaded onto the testing apparatus which was designed to mop 7.16 ft² using even pressure and speed. The sweeping tool head was then lowered to the linoleum floor and start was pressed on the floor cleaning test. The floor was cleaned in a cleaning pattern illustrated in FIG. 2. The cleaning head holder was modified in that a nominal 4.5 pounds of force was added to the flooring substrate and it operated at a nominal speed of 16.7 cm per second (6.6 in. per second). The apparatus then cleaned 7.16 ft². Once the testing apparatus had run the floor mop over 7.16 ft², the floor was dried with a microfiber cloth, and the test was repeated by pressing home on the machine then start-without picking the mop up from the floor to reset to the start position. This procedure was repeated until 21.46 ft²—three cycles—had been completed. At the end of the third cycle, the floor sweeping tool was lifted from the floor, removed from the testing apparatus, and weighed without removing the sample from the tool. The tool and sample were then placed back on the machine and the same procedure as above was followed until 42.92 ft²—three additional testing cycles—were wiped. The floor sweeping tool was again lifted from the floor, removed from the testing apparatus, and weighed without removing the sample from the tool. The tool and sample were then placed back on the machine and the same procedure as above was followed until 71.6 ft²—four additional testing cycles-were wiped. The total number of testing cycles was ten.

TABLE 9

Release of Liquid Study for Control Sample and Samples 1-5

| Sample | Substrate Size | Lotion Weight Relative to the Sample Weight | % Lotion Lost by Area Mopped | | |
|---|---|---|---|---|---|
| | | | 21.46 ft² | 42.92 ft² | 71.6 ft² |
| Control | 10 in. × 4 in. | 6.5x | 16.99 | 25.60 | 36.22 |
| 1 | 10 in. × 4 in. | 6.5x | 16.91 | 26.27 | 36.02 |
| 2 | 10 in. × 4 in. | 7x | 17.97 | 25.34 | 33.05 |
| 3 | 10 in. × 4 in. | 6.5x | 18.72 | 26.53 | 33.41 |
| 4 (unembossed) | 10 in. × 9 in. | 6.5x | 2.42 | 3.71 | 5.03 |
| 4 (embossed) | 10 in. × 9 in. | 6.5x | 13.73 | 17.52 | 19.97 |
| 5 (unembossed) | 10 in. × 9 in. | 6.5x | 2.82 | 4.75 | 6.68 |
| 5 (embossed) | 10 in. × 9 in. | 6.5x | 13.99 | 18.6 | 21.66 |

The results are summarized in Table 9. Samples 2 and 3 containing eucalyptus pulp retained more lotion than the Control Sample and Sample 1. Particularly, Sample 2 containing eucalyptus fibers in the layer on the floor side of the structure retained 3.17% more lotion (by weight) than Control Sample over 71.6 ft². In this case, the layers directly above the layer containing eucalyptus fibers provided a liquid storing area and the bottom layer aids to release and distribute lotion. The results also indicate that unembossed samples retained more lotion as compared to embossed samples.

Example 4: Tile Wetting Test

Select samples were further tested and compared to commercially available products in a Tile Wetting Test. The Tile Wetting Test is designed to compare how much area can be swept with a pre-moistened material before it stops releasing liquid. The present Example tested the number of 12 in.×12 in. floor tiles a pre-moistened material can wet until an end point is reached in which no further liquid is released.

The testing area had dimensions about 40 feet long and about 10 feet wide and included waxed vinyl tiles. Prior to testing, the testing area was dry swept, mopped with clean water and dried.

The sample was weighed and placed on a head of a sweeping tool. The sweeping tool was then placed on the floor at one end of the testing area and pushed to the other end. The sweeping tool was then pushed back on a dry section of the testing area adjacent to the area previously swept. The pattern was repeated and the floor was observed and marked when the sample was no longer releasing any liquid. Once the sample was no longer releasing liquid, the number of 12 in.×12 in. tiles that had been mopped was recorded. After the sample had released all the liquid, the sample was reweighed to determine the amount of liquid loss. Each test was replicated 3 times.

Three compositions were tested: Control Sample, Sample 2 and Sample 5. Compositions of these Samples are provided in Tables 3, 5 and 8, respectively. Commercially available Swiffer® Sweeper Wet—Wet Mopping Cloths with Gain® and Walmart® Great Value Wet Mopping Cloths were also tested. The results are summarized in Table 10.

TABLE 10

Tile Wetting Test Results

| Sample Tested | Average Percent Lotion Lost | Average Number of 12 in. × 12 in. Tiles Wetted | Number of Tiles, Rep. 1 | Number of Tiles, Rep. 2 | Number of Tiles, Rep. 3 |
|---|---|---|---|---|---|
| Swiffer ® Sweeper Wet—Wet Mopping Cloths with Gain ® | 30.98 | 298 | 257 | 308 | 329 |
| Walmart ® Great Value Wet Mopping Cloths | 25.48 | 192 | 226 | 192 | 159 |
| Control Sample | 30.50 | 319 | 302 | 291 | 365 |
| Sample 2 | 29.78 | 431 | 380 | 416 | 496 |
| Sample 5 | 21.77 | 349 | 346 | 344 | 356 |

Results of the Tile Wetting Test provided that on average all three samples were able to wet more 12 in.×12 in. tiles than commercially available products. The Control Sample wetted on average 21 and 127 more tiles than commercially available products tested. Sample 5 wetted on average 51 and 157 more tiles than commercially available products tested. Sample 2 wetted on average 133 and 239 more tiles than commercially available products tested. These results provide for increased metered release of liquids in nonwoven materials having a layer on the floor sweeping side including eucalyptus fibers.

Example 5: Stain Removal Test

Select samples were further tested to evaluate cleaning and stain removal efficacy. Three compositions were tested: Control Sample, Sample 2 and Sample 5. Compositions of these Samples are found in Tables 3, 5, and 8, respectively. Commercially available Swiffer® Sweeper Wet—Wet Mopping Cloths with Gain® and Walmart® Great Value Wet Mopping Cloths were also tested. Using a Gardner Straight-Line Washability Apparatus (WA-2175, Model D16VF) operating at 1 pound of pressure and 40 cycles per minute, a 4 in.×3 in. sample was cut and mounted on a scrubbing block. The apparatus was started and the number of cycles to remove each of five different stains from a vinyl tile (Armstrong Flooring 56830031 Feature Tile R627A) was recorded. A schematic of the testing apparatus is illustrated in FIG. 3. To produce the stains, a vinyl tile was cut into a 4 in. wide strip and five (5) 1.5-inch ID O-rings were used to contain solutions while they dried on the vinyl tile. A solution (1 mL) was added to the center of the O-ring every 1.5 hours until a total volume of 4 mL was added. Five different solutions were used, and stains therefrom tested, one solution per O-ring as described below. The solutions remained at room temperature for 72 hours until dry. The vinyl tile was then heated in an oven at 100° F. for 1 hour. Samples were then tested within 2-4 hours.

The following stains were tested: hot chocolate, coffee, orange juice (high pulp), grape juice and potting soil. The hot chocolate (Swiss Miss®) was prepared according to instructions and powdered creamer was added (1 tsp, Coffee Mate®). The coffee was prepared with instant coffee (Maxwell House®), water (180 mL), sugar (1 tsp), and powdered creamer (Coffee Mate®). The potting soil was prepared with a 50:50 blend of potting soil (Miracle Grow®) and water to produce mud. Prior to testing, the O-ring was removed and loose dirt was knocked off in order to simulate sweeping the floor leaving mud stain was on the vinyl tile prior to testing.

The results are summarized in Table 11.

TABLE 11

Stain Removal Test Results

| Sample Tested | Average Number of Cycles to Clean Stains | | | | |
|---|---|---|---|---|---|
| | Cocoa | Coffee | Orange Juice | Grape Juice | Soil |
| Swiffer ® Sweeper Wet—Wet Mopping Cloths with Gain | 13 | 7 | 115 | 11 | 9 |
| Walmart ® Great Value Wet Mopping Cloths | 13 | 7 | 107 | 10 | 8 |
| Control Sample | 12 | 6 | 102 | 10 | 6 |
| Sample 2 | 10 | 6 | 81 | 8 | 3 |
| Sample 5 | 13 | 8 | 89 | 9 | 4 |

As illustrated in Table 11, the two commercial samples provided similar results, with an exception of Walmart® Great Value Mopping Cloths showing slightly improved results on average at removing orange juice, grape juice and soil stains (107 vs 115 cycles, 10 vs 11 cycles and 8 vs 9 cycles, respectively). The Control Sample provided improved results as compared to commercial products for all tested stains except for grape juice, where on average it showed the same results as Walmart® Great Value Wet Mopping Cloths. Sample 5 on average provided similar results in the removal of cocoa stains as the commercial samples and provided improved results on average at removing orange juice, grape juice and soil stains as compared to commercial samples and on average needed one more cycle to remove coffee stains than commercial samples. Sample 2 provided the improved results overall, on average less cycles were needed to clean any of the five stains as compared to commercially available samples and Control Sample and Sample 5.

Example 6: Multi-Layer Unitary, Absorbent Structure Used for Storage and Metered Release of Liquid with Eucalyptus as Only Pulp Fiber Sample 6 is a unitary, absorbent composite composed of a single layer which provides for the storage of liquid and a metered release of liquid.

The composition of Sample 6 is shown in Table 12.

TABLE 12

Sample 6 Composition

| Type of Material | Raw Materials | Basis Weight (gsm) |
|---|---|---|
| Pulp | Eucalyptus CFU | 102.5 |
| Synthetic Fiber | Trevira T255 4703 1.5 dtex | 22.5 |
| Total | | 125.0 |

The substrate is a 125 gsm thermal-bonded Dan-Web Airlaid Nonwoven (TBAL) product with 18 wt-% bicomponent synthetic fibers. The sample includes a single homogeneous layer. The layer contains 102.5 gsm of eucalyptus pulp (Suzano, untreated) and 22.5 gsm synthetic fibers (Trevira Type 255-1.5 dtex 6 mm).

Example 7: Multi-Layer Unitary, Absorbent Structure Used for Storage and Metered Release of Liquid with Eucalyptus as Only Pulp Fibers with an Eccentric Fiber Layer on Top Sample 7 is a unitary, absorbent composite composed of two layers, stacked one on another, which provides for the storage of liquid and a metered release of liquid.

The composition of Sample 7 is shown in Table 13.

TABLE 13

Sample 7 Composition

| Layer | Type of Material | Raw Materials | Basis Weight (gsm) |
|---|---|---|---|
| Top Floor Side | Pulp | | |
| | Synthetic Fiber | Trevira T255 6.7 dtex eccentric | 25.00 |
| Bottom Floor Sweeping Tool side | Pulp | Eucalyptus CFU | 102.5 |
| | Synthetic Fiber | Trevira T255 4703 1.5 dtex | 22.5 |
| | Binder | Wacker Vinnapas 192 | 5.00 |
| | Total | | 155.0 |

The substrate is a 155 gsm multi-bonded Dan-Web Airlaid Nonwoven (MBAL) product with 31.6 percent bicomponent synthetic fibers. The sample includes two layers. The bottom layer contains 102.5 gsm of eucalyptus pulp (Suzano, untreated) and 22.5 gsm synthetic fibers (Trevira Type 255-1.5 dtex 6 mm). The top layer contains 25 gsm of eccentric bicomponent fibers (Trevira Type 255-6.7 dtex 5 mm). The binder, 5 gsm (Wacker Vinnapas 192), is applied to the bottom (floor sweeping tool side) of the structure.

Example 8: Multi-Layer Unitary, Absorbent Structure Used for Absorption and Storage of Liquid with Eucalyptus in the Bottom Layer and Eccentric Bicomponent Fibers on the Top Layer Sample 8 is a unitary, absorbent composite composed of three layers, stacked one on another, which provides for the storage of liquid and a metered release of liquid.

The composition of Sample 8 is shown in Table 14.

TABLE 14

Sample 8 Composition

| Layer | Type of Material | Raw Materials | Basis Weight (gsm) |
|---|---|---|---|
| | | Tackifier | 0.25-6 |
| Top Floor Side | Pulp Synthetic Fiber | Trevira T255 6.7 dtex eccentric | 25.00 |
| Middle | Pulp Synthetic Fiber | Leaf River Fully-Treated 4723 Trevira T255 4743 1.7 dtex | 70.00 30.00 |
| Bottom Floor Sweeping Tool side | Pulp Synthetic Fiber | Eucalyptus CFU Trevira T255 4703 1.5 dtex | 62.00 8.00 |
| | Binder | Wacker Vinnapas 192 | 5.00 |
| | | Total | 200.0 |

The substrate is a 200 gsm multi-bonded Dan-Web Airlaid Nonwoven (MBAL) product with 31.5 percent bicomponent synthetic fibers and 2.5 percent binder. This sample includes three fiber layers. The bottom layer contains 62 gsm of eucalyptus pulp (Suzano, untreated) and 8 gsm synthetic fibers (Trevira Type 255-1.5 dtex 6 mm). The middle layer contains 70 gsm of cellulose (GP 4723, fully-treated pulp made by Georgia-Pacific) and 30 gsm synthetic fibers (Trevira Type 255-1.7 dtex 6 mm). The top layer contains 25 gsm of eccentric bicomponent fibers (Trevira Type 255-6.7 dtex 5 mm). The binder, 5 gsm (Wacker Vinnapas 192), is applied to the bottom (floor sweeping tool side) of the structure.

Example 9: Multi-Layer Unitary, Absorbent Structure Used for Absorption and Storage of Liquid with Eucalyptus in the Middle Layer and Eccentric Bicomponent Fibers on the Top Layer Sample 9 is a unitary, absorbent composite composed of three layers, stacked one on another, which provides for the storage of liquid and a metered release of liquid.

The composition of Sample 9 is shown in Table 15.

TABLE 15

Sample 9 Composition

| Layer | Type of Material | Raw Materials | Basis Weight (gsm) |
|---|---|---|---|
| | | Tackifier | 0.25-6 |
| Top Floor Side | Pulp Synthetic Fiber | Trevira T255 6.7 dtex eccentric | 25.00 |
| Middle | Pulp Synthetic Fiber | Eucalyptus CFU Trevira T255 4703 1.5 dtex | 62.00 8.00 |

TABLE 15-continued

Sample 9 Composition

| Layer | Type of Material | Raw Materials | Basis Weight (gsm) |
|---|---|---|---|
| Bottom Floor Sweeping Tool side | Pulp Synthetic Fiber | Leaf River Fully-Treated 4723 Trevira T255 4743 1.7 dtex | 70.00 30.00 |
| | Binder | Wacker Vinnapas 192 | 5.00 |
| | | Total | 200.0 |

The substrate is a 200 gsm multi-bonded Dan-Web Airlaid Nonwoven (MBAL) product with 31.5 percent bicomponent synthetic fibers and 2.5 percent binder. Sample 9 includes three layers analogous to Sample 5. The bottom layer contains 70 gsm of cellulose (GP 4723, fully-treated pulp made by Georgia-Pacific) and 30 gsm synthetic fibers (Trevira Type 255-1.7 dtex 6 mm). The middle layer contains 62 gsm of eucalyptus pulp (Suzano, untreated) and 8 gsm synthetic fibers (Trevira Type 255-1.5 dtex 6 mm). The top layer contains 25 gsm of eccentric bicomponent fibers (Trevira Type 255-6.7 dtex 5 mm). The binder, 5 gsm (Wacker Vinnapas 192), is applied to the bottom (floor sweeping tool side) of the structure.

After the sample is provided, 0.25-6 gsm of a tacky adhesive is added to the top layer (floor side), for example, to increase particle pick-up.

Example 10: Multi-Layer Unitary, Absorbent Structure Used for Storage and Metered Release of Liquid with Eucalyptus in the Middle Layer and Eccentric Bicomponent Fibers on the Top (Basis Weight and Raw Material Comparison)

The present example provides unitary, absorbent composites composed of three layers, stacked one on another, which is designed to store liquid, offer a measured release of liquid, and replace the spunlace used in commercially available disposable wet mopping cloths.

The compositions of Sample 10A, Sample 10B, Sample 10C, and Sample 10D are shown in Tables 16, 17, 18, and 19, respectively.

TABLE 16

Sample 10A Composition

| Layer | Type of Material | Raw Materials | Basis Weight (gsm) |
|---|---|---|---|
| Top Floor Side | Pulp Synthetic Fiber | Trevira T-2551683 6.7 dtex 6 mm eccentric | 25.00 |
| Middle | Pulp Synthetic Fiber | Eucalyptus CFU Trevira T255 4703 30% core 1.5 dtex 6 mm | 62.00 8.00 |
| Bottom Floor Sweeping Tool side | Pulp Synthetic Fiber | Golden Isles Leaf River 4725 Trevira T255 4743 70% core 1.7 dtex 6 mm | 70.00 30.00 |
| | Binder | Wacker Vinnapas 192 | 5.00 |
| | | Total | 200.0 |

Sample 10A included three layers. The bottom layer contained 70 gsm of cellulose (Golden Isles Leaf River 4725) and 30 gsm synthetic fibers (Trevira T255 4743 70% core 1.7 dtex 6 mm). The middle layer contained 62 gsm of eucalyptus pulp (Suzano, untreated) and 8 gsm synthetic fibers (Trevira T255 4703 30% core 1.5 dtex 6 mm). The top layer contained 25 gsm of eccentric bicomponent fibers (Trevira T-2551683 6.7 dtex 6 mm). The binder, 5 gsm (Wacker Vinnapas 192), was applied to the bottom (floor sweeping tool side) of the structure. The total weight of the structure was calculated to be 200.0 gsm.

TABLE 17

Sample 10B Composition

| Layer | Type of Material | Raw Materials | Basis Weight (gsm) |
|---|---|---|---|
| Top Floor Side | Pulp Synthetic Fiber | Trevira T-255 1683 6.7 dtex 6 mm eccentric | 25.00 |
| Middle | Pulp Synthetic Fiber | Eucalyptus CFU Trevira T255 4703 30% core 1.5 dtex 6 mm | 42.64 9.36 |
| Bottom Floor Sweeping Tool side | Pulp Synthetic Fiber | Golden Isles Leaf River 4725 Trevira T255 4743 70% core 1.7 dtex 6 mm | 63.96 14.04 |
| | Binder | Wacker Vinnapas 192 | 5.00 |
| | | Total | 160.0 |

Sample 10B included three layers. The bottom layer contained 63.96 gsm of cellulose (Golden Isles Leaf River 4725) and 14.04 gsm synthetic fibers (Trevira T255 4743 70% core 1.7 dtex 6 mm). The middle layer contained 42.64 gsm of eucalyptus pulp (Suzano, untreated) and 9.36 gsm synthetic fibers (Trevira T255 4703 30% core 1.5 dtex 6 mm). The top layer contained 25 gsm of eccentric bicomponent fibers (Trevira T-2551683 6.7 dtex 6 mm). The binder, 5 gsm (Wacker Vinnapas 192), was applied to the bottom (floor sweeping tool side) of the structure. The total weight of the structure was calculated to be 160.0 gsm.

TABLE 18

Sample 10C Composition

| Layer | Type of Material | Raw Materials | Basis Weight (gsm) |
|---|---|---|---|
| Top Floor Side | Pulp Synthetic Fiber | Trevira T-255 1683 6.7 dtex 6 mm eccentric | 25.00 |
| Middle | Pulp Synthetic Fiber | Eucalyptus CFU Trevira T255 1661 PEPET 2.2 dtex 6 mm | 62.00 8.00 |
| Bottom Floor Sweeping Tool side | Pulp Synthetic Fiber | Golden Isles Leaf River 4725 Trevira T255 1661 PEPET 2.2 dtex 6 mm | 70.00 30.00 |
| | Binder | Wacker Vinnapas 192 | 5.00 |
| | | Total | 200.0 |

Sample 10C included three layers. The bottom layer contained 70 gsm of cellulose (Golden Isles Leaf River 4725) and 30 gsm synthetic fibers (Trevira T255 1661 PEPET 2.2 dtex 6 mm). The middle layer contained 62 gsm of eucalyptus pulp (Suzano, untreated) and 8 gsm synthetic fibers (Trevira T255 1661 PEPET 2.2 dtex 6 mm). The top layer contained 25 gsm of eccentric bicomponent fibers (Trevira T-255 1683 6.7 dtex 6 mm). The binder, 5 gsm (Wacker Vinnapas 192), was applied to the bottom (floor sweeping tool side) of the structure. The total weight of the structure was calculated to be 200.0 gsm.

TABLE 19

Sample 10D Composition

| Layer | Type of Material | Raw Materials | Basis Weight (gsm) |
|---|---|---|---|
| Top Floor Side | Pulp Synthetic Fiber | Trevira T-255 1683 6.7 dtex 6 mm eccentric | 25.00 |
| Middle | Pulp Synthetic Fiber | Eucalyptus CFU Trevira T255 4703 1.5 dtex | 42.64 9.36 |
| Bottom Floor Sweeping Tool side | Pulp Synthetic Fiber | Golden Isles Leaf River 4725 Trevira T255 1661 PEPET 2.2 dtex 6 mm | 63.96 14.04 |
| | Binder | Wacker Vinnapas 192 | 5.00 |
| | | Total | 160.0 |

Sample 10D included three layers. The bottom layer contained 63.96 gsm of cellulose (Golden Isles Leaf River 4725) and 14.04 gsm synthetic fibers (Trevira T255 1661 PEPET 2.2 dtex 6 mm). The middle layer contained 42.64 gsm of eucalyptus pulp (Suzano, untreated) and 9.36 gsm synthetic fibers (Trevira T255 4703 1.5 dtex). The top layer contained 25 gsm of eccentric bicomponent fibers (Trevira T-255 1683 6.7 dtex 6 mm). The binder, 5 gsm (Wacker Vinnapas 192), was applied to the bottom (floor sweeping tool side) of the structure. The total weight of the structure was calculated to be 160.0 gsm.

Example 11: Tile Wetting Test

The samples of Example 10 (Sample 10A, Sample 10B, Sample 10C, and Sample 10D) were tested and compared to commercially available products in a Tile Wetting Test the method of which is provided in Example 4. A list of the samples tested is shown in Table 20. The results are summarized in Table 21.

TABLE 20

Samples Tested

| Sample | Description |
|---|---|
| A | Swiffer ® Sweeper Wet—Wet Mopping Cloths with Gain ® |
| B | Walmart ® Great Value Wet Mopping Cloths |
| C | Sample 10A |
| D | Sample 10A |
| E | Sample 10B |
| F | Sample 10C |
| G | Sample 10C |
| H | Sample 10D |
| I | Sample 10D |
| J | Sample 10D |
| K | Sample FC Core |
| L | Sample FC Core |

Control samples A and B were tested. Samples K and L each had the same composition as the Sample 2 composition provided in Table 5. Samples K and L were embossed between two pieces of spunlace. Samples C, E, F, H, K and L each had the same embossed pattern as Sample B. Samples D, G, I, and J used a different emboss pattern. Samples C, E, F, G, H, I and K used the same lotion as Sample B (expressed from commercially available wipes). Samples D, J, and L used a different lotion than Samples C, E, F, G, H, L and K (a multi-purpose floor cleaning lotion).

TABLE 21

Tile Wetting Test Results

| Sample | Description | Average Percent Lotion Loss | Average Number of 12" × 12" Tiles |
|---|---|---|---|
| A | Swiffer ® Sweeper Wet—Wet Mopping Cloths with Gain | 25.62 | 274 |
| B | Walmart ® Great Value Wet Mopping Cloths | 30.74 | 496 |
| C | Sample 10A | 9.74 | 297 |
| D | Sample 10A | 10.11 | 311 |
| E | Sample 10B | 6.86 | 232 |
| F | Sample 10C | 26.56 | 813 |
| G | Sample 10C | 22.39 | 523 |
| H | Sample 10D | 11.21 | 626 |
| I | Sample 10D | 12.54 | 395 |
| J | Sample 10D | 13.30 | 492 |
| K | Sample FC Core | 35.64 | 835 |
| L | Sample FC Core | 33.09 | 588 |

The results indicate that Samples C through L containing eucalyptus pulp retained more lotion than control Samples A and B. In particular, both Samples C through J including a layer containing eucalyptus pulp and Samples K and L used as a core product between spunlace had less percent average lotion loss than the control Samples A and B.

Example 12: Stain Removal Test

Sample 10C was further tested to evaluate the sample cleaning ability and ability to remove stains. Sample 10C was tested in a dry state and in a dry state with a tackifier (approx. 3 gsm) applied to a top layer (floor surface) of the material. The composition of Sample 10C is provided in Table 18. Commercially available Stainmaster® Microfiber Cloth and Swiffer® Wet Jet-Disposable Mop were also tested. The results are summarized in Table 22. Using a Gardner Straight-Line Washability Apparatus (WA-2175, Model D16VF) operating at 1 pound of pressure and 40 cycles per minute, a 4 in.×3 in. sample was cut and mounted on a scrubbing block. The apparatus was started and the number of cycles to remove each of five different stains from a vinyl tile (Armstrong Flooring 56830031 Feature Tile R627A) was recorded. A schematic of the testing apparatus is illustrated in FIG. 3. To produce the stains, a vinyl tile was cut into a 4 in. wide strip and five (5) 1.5-inch ID O-rings were used to contain solutions while they dried on the vinyl tile. A solution (1 mL) was added to the center of the O-ring every 1.5 hours until a total volume of 4 mL was added. Five different solutions were used, and stains therefrom tested, one solution per O-ring as described below. The solutions remained at room temperature for 72 hours until dry. The vinyl tile was then heated in an oven at 100° F. for 1 hour. Samples were then tested within 2-4 hours.

The following stains were tested: hot chocolate, coffee, orange juice (high pulp), grape juice and potting soil. The hot chocolate (Swiss Miss®) was prepared according to instructions and powdered creamer was added (1 tsp, Coffee Mate®). The coffee was prepared with instant coffee (Maxwell House®), water (180 mL), sugar (1 tsp), and powdered creamer (Coffee Mate®). The potting soil was prepared with a 50:50 blend of potting soil (Miracle Grow®) and water to produce mud. Prior to testing, the O-ring was removed and loose dirt was knocked off in order to simulate sweeping the floor leaving mud stain was on the vinyl tile prior to testing.

To perform the test, cleaning solution (approx. 2 mL) was added to each of the stains using a pipette. The same cleaning solution (approx. 15 mL) was poured onto the floor cleaning test pad with a graduated cylinder. Swiffer® Wet Jet Multi-Purpose Floor Cleaner Solution with Febreze® refill lavender vanilla and comfort scent was used for all samples.

The results are summarized in Table 22.

TABLE 22

Stain Removal Test Results

| | Average Number of Cycles to Clean Stains | | | | |
|---|---|---|---|---|---|
| Sample Tested | Cocoa | Coffee | Orange Juice | Grape Juice | Soil |
| Stainmaster ® Microfiber Cloth | 9 | 5 | 121 | 11 | 3 |
| Swiffer ® Wet Jet—Disposable Mop | 14 | 6 | 200 | 15 | 3 |
| Sample 10C (Dry) | 12 | 6 | 108 | 12 | 4 |
| Sample 10C (Dry) 3 gsm Tackifier | 10 | 5 | 98 | 11 | 4 |

*Test stopped when 200 cycles reached

As provided in Table 22, Sample 10C (dry) and Sample 10C (dry with tackifier) showed improved results on average at removing orange juice stains as compared to the commercially available Stainmaster® Microfiber Cloth and Swiffer® Wet Jet-Disposable Mop.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed is:

1. A unitary airlaid nonwoven material comprising three layers of fibers, wherein
a first layer of the three layers of fibers comprises synthetic bicomponent fibers, each synthetic bicomponent fiber having a core comprising a first polymer and a sheath comprising a second polymer, the sheath surrounding the core;
a second layer of the three layers of fibers comprises cellulose fibers and synthetic low core bicomponent fibers, each synthetic low core bicomponent fiber having a core comprising a first polymer and a sheath comprising a second polymer, the sheath surrounding the core, wherein the core is less than 50% by weight of the synthetic low core bicomponent fiber;

a third layer of the three layers of fibers comprises cellulose fibers and synthetic high core bicomponent fibers, each synthetic high core bicomponent fiber having a core comprising a first polymer having a melting point above 200° C. and a polyethylene sheath surrounding the core, wherein the core is more than 50% by weight of the synthetic high core bicomponent fiber;

one or both of the cellulose fibers of the second layer and the third layer comprise hardwood bonded natural cellulosic fibers having a coarseness ranging from about 4.2 mg/100 m to about 8.8 mg/100 m.

2. The unitary airlaid nonwoven material of claim 1, wherein the bonded natural cellulosic fibers have a coarseness of about 6.5 mg/100 m.

3. The unitary airlaid nonwoven material of claim 1, wherein the bonded natural cellulosic fibers have a Kajaani weighted average length of about 1.5 mm or less.

4. The unitary airlaid nonwoven material of claim 1, wherein the bonded natural cellulosic fibers comprise eucalyptus pulp.

5. The unitary airlaid nonwoven material of claim 1, wherein at least one layer of the three layers of fibers is coated on at least a portion of its surface with a binder.

6. The unitary airlaid nonwoven material of claim 1, wherein at least one layer of the three layers of fibers is coated on at least a portion of its surface with an adhesive.

7. The unitary airlaid nonwoven material of claim 1, wherein the nonwoven material further comprises a cleaning formulation.

8. The unitary airlaid nonwoven material of claim 7, wherein the cleaning formulation is aqueous based.

9. The unitary airlaid nonwoven material of claim 1, wherein the first layer further comprises cellulose fibers.

10. The unitary airlaid nonwoven material of claim 9, wherein the cellulose fibers of the first layer comprise hardwood bonded natural cellulosic fibers having a coarseness ranging from about 4.2 mg/100 m to about 8.8 mg/100 m.

11. The unitary airlaid nonwoven material of claim 1, wherein the first polymer having a melting point above 200° C. is polyethylene terephthalate.

12. The unitary airlaid nonwoven material of claim 1, wherein the first polymer of the core of the synthetic low core bicomponent fiber is polyethylene terephthalate and the second polymer of the sheath synthetic low core bicomponent fiber is polyethylene.

13. The unitary airlaid nonwoven material of claim 1, wherein the core is no more than 70% by weight of the synthetic high core bicomponent fiber.

14. The unitary airlaid nonwoven material of claim 1, wherein the core is at least 30% by weight of the synthetic low core bicomponent fiber.

15. The unitary airlaid nonwoven material of claim 1, wherein
the first layer has a basis weight ranging from about 20 gsm to about 130 gsm;
the second layer has a basis weight ranging from about 35 gsm to about 110 gsm; and
the second layer has a basis weight ranging from about 30 gsm to about 140 gsm.

16. The unitary airlaid nonwoven material of claim 1, wherein
the second layer is made about 10 to about 25 wt % of synthetic low core bicomponent fibers and about 75 to about 90 wt % of cellulose fibers, or
the third layer is made about 10 to about 25 wt % of synthetic high core bicomponent fibers and about 75 to about 90 wt % of the cellulose fibers.

17. The unitary airlaid nonwoven material of claim 1, wherein
the second layer is made about 10 to about 25 wt % of synthetic low core bicomponent fibers and about 75 to about 90 wt % of cellulose fibers, and
the third layer is made about 10 to about 25 wt % of synthetic high core bicomponent fibers and about 75 to about 90 wt % of the cellulose fibers.

18. The unitary airlaid nonwoven material of claim 1, wherein
the second layer is made about 15 to about 20 wt % of synthetic low core bicomponent fibers and about 80 to about 85 wt % of cellulose fibers, or
the third layer is made about 15 to about 20 wt % of synthetic high core bicomponent fibers and about 80 to about 85 wt % of the cellulose fibers.

19. The unitary airlaid nonwoven material of claim 1, wherein
the second layer is made about 15 to about 20 wt % of synthetic low core bicomponent fibers and about 80 to about 85 wt % of cellulose fibers, and
the third layer is made about 15 to about 20 wt % of synthetic high core bicomponent fibers and about 80 to about 85 wt % of the cellulose fibers.

* * * * *